(12) United States Patent
Yumisashi et al.

(10) Patent No.: US 10,514,103 B2
(45) Date of Patent: Dec. 24, 2019

(54) REFRIGERANT CONTROL VALVE APPARATUS

(71) Applicant: AISIN SEIKI KABUSHIKI KAISHA, Kariya-shi, Aichi (JP)

(72) Inventors: Naoto Yumisashi, Nagoya (JP); Koichi Maruyama, Anjo (JP); Yojiro Koga, Kariya (JP); Hideyuki Suzuki, Toyohashi (JP); Masanobu Matsusaka, Chita (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 97 days.

(21) Appl. No.: 15/558,478

(22) PCT Filed: Dec. 10, 2015

(86) PCT No.: PCT/JP2015/084601
§ 371 (c)(1),
(2) Date: Sep. 14, 2017

(87) PCT Pub. No.: WO2016/157630
PCT Pub. Date: Oct. 6, 2016

(65) Prior Publication Data
US 2018/0066758 A1    Mar. 8, 2018

(30) Foreign Application Priority Data
Mar. 30, 2015   (JP) ................ 2015-069711

(51) Int. Cl.
*F16K 11/087* (2006.01)
*F16K 5/06* (2006.01)
(Continued)

(52) U.S. Cl.
CPC .............. *F16K 5/0605* (2013.01); *F01P 7/14* (2013.01); *F16K 5/0663* (2013.01);
(Continued)

(58) Field of Classification Search
None
See application file for complete search history.

(56) References Cited

U.S. PATENT DOCUMENTS 4,881,718 A * 11/1989 Champagne .......... F16K 5/0605
251/209
2007/0119508 A1* 5/2007 West ..................... F16K 11/085
137/625.47

(Continued)

FOREIGN PATENT DOCUMENTS

JP    2002-98245 A    4/2002
JP    2010-507762 A    3/2010

(Continued)

OTHER PUBLICATIONS

International Search Report (PCT/ISA/210) dated Feb. 16, 2016, by the Japanese Patent Office as the International Searching Authority for International Application No. PCT/JP2015/084601.

(Continued)

*Primary Examiner* — John Fox
(74) *Attorney, Agent, or Firm* — Buchanan, Ingersoll & Rooney PC

(57) ABSTRACT

A refrigerant control valve apparatus which maintains improved sealing ability while being restrained from being enlarged includes a housing including a first discharge port and a second discharge port which includes a smaller diameter than the first discharge port, a rotor rotatably housed at the housing, a bore portion provided at an outer wall portion of the rotor to control a flow of refrigerant relative to the first discharge port and the second discharge port, a second seal portion of the second discharge port being configured to make contact with an edge portion of the bore portion in a case where the rotor is specified at any rotation position for sending out the refrigerant to the second discharge port.

13 Claims, 18 Drawing Sheets

(51) Int. Cl.
- *F01P 7/14* (2006.01)
- *F16K 27/06* (2006.01)
- *F16K 31/04* (2006.01)
- *F16K 31/54* (2006.01)

(52) U.S. Cl.
CPC ........ *F16K 11/0876* (2013.01); *F16K 27/067* (2013.01); *F16K 31/043* (2013.01); *F16K 31/54* (2013.01); *F01P 2007/146* (2013.01)

(56) References Cited

U.S. PATENT DOCUMENTS

| | | | |
|---|---|---|---|
| 2010/0282190 A1 | 11/2010 | Stoermer | |
| 2012/0217425 A1* | 8/2012 | Beasley | F16K 5/0678 251/174 |
| 2014/0305154 A1* | 10/2014 | Yoshioka | F25B 41/04 62/324.6 |
| 2015/0083057 A1 | 3/2015 | Tsuchiya et al. | |
| 2016/0040585 A1* | 2/2016 | Schaefer | F01P 3/20 137/1 |
| 2016/0178073 A1* | 6/2016 | Iversen | F16K 11/0873 137/550 |
| 2017/0009894 A1 | 1/2017 | Seko et al. | |
| 2018/0149073 A1* | 5/2018 | Shen | F01P 7/165 |

FOREIGN PATENT DOCUMENTS

| | | |
|---|---|---|
| JP | 2016-053415 A | 4/2016 |
| JP | 2016-113929 A | 6/2016 |
| WO | WO 2014/187452 A1 | 11/2014 |

OTHER PUBLICATIONS

Written Opinion (PCT/ISA/237) dated Feb. 6, 2016, by the Japanese Patent Office as the International Searching Authority for International Application No. PCT/JP2015/084601.

Helduk et al., "The new generation of the R4 TFSI engine from Audi", Internationales Wiener Motorensymposium 2011 (month unknown), 26 pages.

U.S. Appl. No. 15/945,208, filed Apr. 4, 2018, Masafumi Yoshida et al.

Extended European Search Report issued by the European Patent Office dated Mar. 27, 2018 in corresponding European Patent Application No. 15887772.0 (7 pages).

* cited by examiner

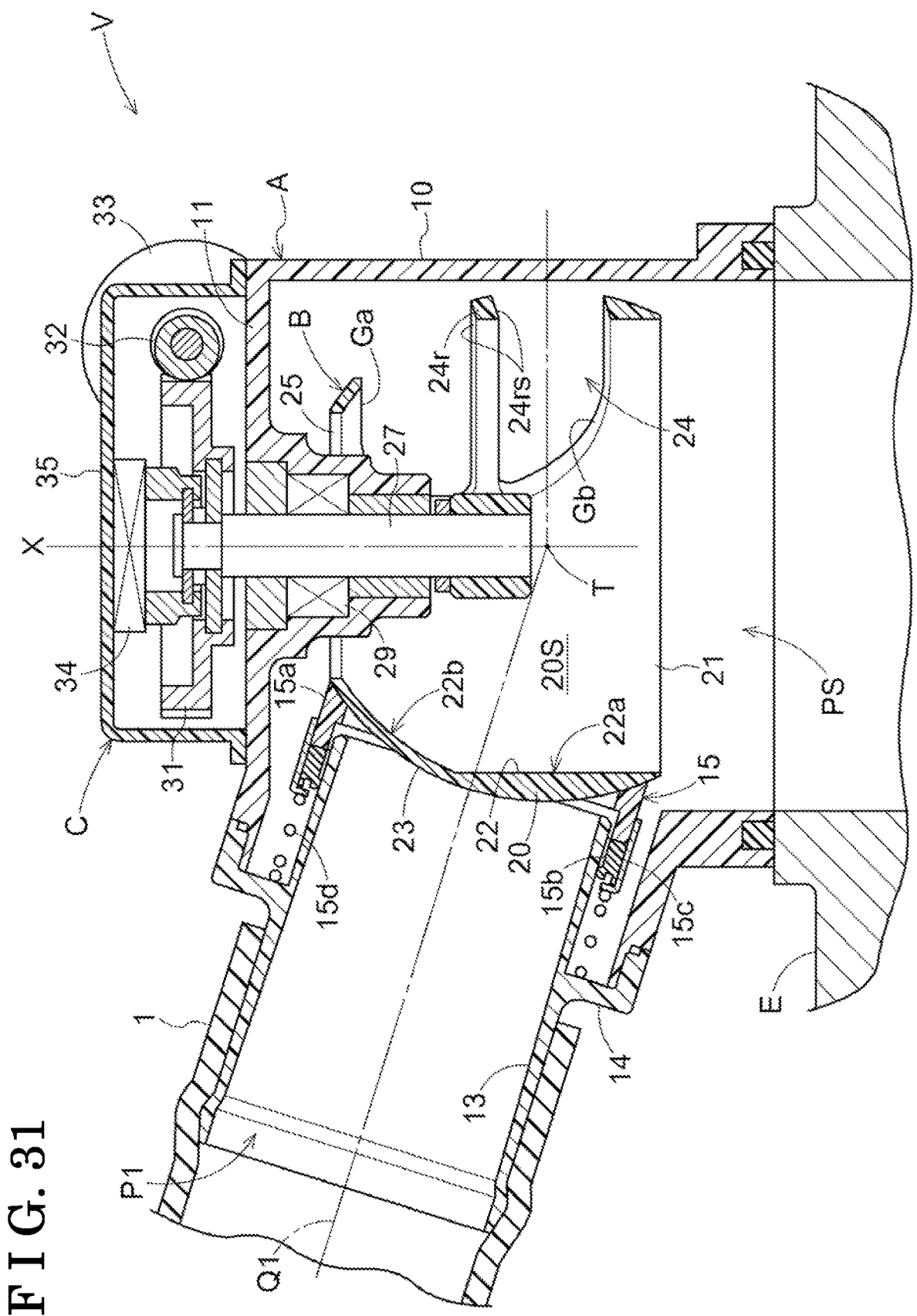
F I G. 31

REFRIGERANT CONTROL VALVE APPARATUS

TECHNICAL FIELD

This invention relates to a refrigerant control valve apparatus in which a rotor for controlling a flow of refrigerant is rotatably housed at an inner portion of a housing which includes a discharge port.

BACKGROUND ART

Patent document 1 discloses, as a refrigerant control valve apparatus, a technique where a rotor (i.e., a cross-section adjustment member in Patent document 1) is rotatably arranged at an inner portion of a housing. In Patent document 1, openings provided at an outer periphery of the rotor overlap ports (i.e., openings of connection pipes in Patent document 1) provided at the housing so that a flow of refrigerant is obtainable between an inner portion of the rotor and the ports.

In Patent document 1, the rotor is formed in a spherical form. An opening which opens along a rotational axis of the rotor and the plural openings for the ports disposed at an outer wall surface in the spherical form are provided at the rotor.

Patent document 2 discloses a technique where a tubular rotor (i.e., a valve body in Patent document 2) is rotatably arranged at an inner portion of a housing. In an apparatus disclosed in Patent document 2, a first fluid passage and a second fluid passage are provided at the housing so as to be arranged next to each other in a circumferential direction of the rotor (i.e., arranged overlapping each other in a direction along a rotational axis of the rotor). In addition, a third fluid passage is provided at the housing so as to open in the direction along the rotational axis. An opening is provided at the rotor so as to open in the direction along the rotational axis, the opening being constantly in communication with the third fluid passage. An opening for controlling a flow of refrigerant relative to the first and second fluid passages is also provided at the rotor.

Based on setting of a rotation position of the rotor in the aforementioned construction, a state where, while one of the first and second fluid passages is closed, the refrigerant flows to the other of the first and second fluid passages and a state where, while the first fluid passage is closed, an amount of refrigerant flowing through the second fluid passage is reduced are obtainable.

DOCUMENT OF PRIOR ART

Patent Document

Patent document 1: JP2010-507762A
Patent document 2: JP2002-98245A

OVERVIEW OF INVENTION

Problem to be Solved by Invention

Here, it is assumed that a single supply port to which a refrigerant is supplied and two discharge ports from which the refrigerant is discharged are provided at a housing as an example of a valve apparatus which is configured so that a rotor is rotatably housed in a housing. In this case, in the apparatus where the plural discharge ports are provided at the housing in a manner being arranged next to one another along the rotational axis such as disclosed in Patent document 1, the size of the valve apparatus in the direction along the rotational axis may increase. Thus, in order to reduce the size of the valve apparatus in the direction along the rotational axis, it is effective to provide the two discharge ports at the housing so that the two discharge ports are arranged next to each other in the circumferential direction (i.e., at positions where the discharge ports overlap each other in the direction along the rotational axis of the rotor), in the same way as the first and second fluid passages as disclosed in Patent document 2.

According to the refrigerant control valve apparatus including the two discharge ports, it is also necessary to establish plural states including a state where coolant water is simultaneously sent out from the two discharge ports, a state where a flow of coolant water to the two discharge ports is simultaneously interrupted and a state where the coolant water is sent out from one of the two discharge ports based on a rotation operation of the rotor. In a construction where the two discharge ports are arranged along the circumferential direction same as the construction in Patent document 2, a construction where plural openings are provided at an outer periphery of the rotor along the circumferential direction thereof so as to control the flow of the refrigerant relative to the two discharge ports and a construction where a single opening which extends along the outer periphery of the rotor are considerable, for example.

In the refrigerant control valve apparatus, in order to inhibit leakage of refrigerant in a case where the discharge ports are closed, a seal is provided for each of the discharge ports. In a case where it is assumed that inner diameters of the two discharge ports are different from each other, a construction where a large-diameter opening for the discharge port with a large diameter and a small-diameter opening for the discharge port with a large diameter are provided at the rotor is considerable. In the aforementioned construction, however, in a case where the large-diameter opening is brought to be positioned at the small-diameter discharge port, only a part of the seal for the small-diameter discharge port may make contact with an edge portion of the large-diameter opening. In such contact state, decrease in sealing ability because of unbalanced abrasion of the seal, inappropriate posture of the seal or dislocation of the seal, for example, may be considered. In order to solve the aforementioned drawbacks, it is effective to increase dimensions of the rotor in the circumferential direction to enlarge an interval between the openings. Nevertheless, such increase may lead to increase of the diameter of the rotor.

In addition, it may be assumed that an opening in an elongated form obtained by a bore portion in large width (i.e., a large width in the direction along the rotational axis) for the large-diameter discharge port and a bore portion in small width (i.e., a small width in the direction along the rotational axis) for the small-diameter discharge port, the bore portions being continuously provided in the circumferential direction, is provided at the rotor. In the aforementioned assumption, the diameter of the rotor may be reduced, however, the same drawbacks as mentioned above may occur. That is, in a case where the small-diameter discharge port is brought to be positioned at the bore portion in large width by the rotation of the rotor, only a part of the seal for the small-diameter discharge port may make contact with an edge portion of the bore portion in large width. In such contact state, decrease in sealing ability because of unbalanced abrasion of the seal, inappropriate posture of the seal or dislocation of the seal, for example, may be considered.

That is, according to the aforementioned refrigerant control valve apparatus, it is desirable that effective sealing ability is maintained while increase in size of the apparatus is restrained.

Means for Solving Problem

A refrigerant control valve apparatus of the present invention based on a characteristic construction thereof includes a housing including an inlet port which receives a refrigerant from an internal combustion engine and at least two discharge ports which are constituted by a first discharge port including a large diameter and a second discharge port including a small diameter, the first discharge port and the second discharge port distributing and sending out the refrigerant, a rotor forming a rotational body and controlling a flow of the refrigerant by rotating about a rotational axis at an inner portion of the housing, a first seal provided at the first discharge port and making contact with an outer surface of the rotor, the first seal including an annular form, and a second seal provided at the second discharge port and making contact with an outer surface of the rotor, the second seal including an annular form, the rotor including a receiving portion receiving the refrigerant from the inlet port, an inner void accommodating the refrigerant which is received, and a bore portion including a first bore portion and a second bore portion for sending out the refrigerant to the first discharge port or the second discharge port, the first bore portion being provided along an extending direction of the rotational axis and formed in a wide width, the second bore portion being provided along the extending direction of the rotational axis and formed in a narrow width, at least a part of the second seal is configured to make contact with an edge portion of the first bore portion in a case where at least a part of the first bore portion is in communication with the second discharge port by a rotation of the rotor.

According to the aforementioned construction, in a case where the first bore portion formed in the wide width reaches the position of the second discharge port by the rotation of the rotor, the state where the part of the second seal at an outer circumference thereof makes contact with the edge portion of the first bore portion is maintained. Thus, the posture of the second seal is inhibited from being inappropriate or the second seal is inhibited form being disengaged. Because the first seal of the first discharge port has a larger diameter than the second seal, a part of the first seal securely makes contact with an outer wall surface of the rotor so that the first seal may be stably supported with any rotation position of the rotor. As a result, while the size of the apparatus is inhibited from increasing, the refrigerant control valve apparatus which maintains improved sealing ability may be constructed.

The refrigerant control valve apparatus of the present invention based on another characteristic construction thereof includes a housing including at least two inlet ports which are constituted by a first inlet port including a large diameter and a second inlet port including a small diameter, the first inlet port and the second inlet port distributing and receiving a refrigerant from an internal combustion engine, the housing including a discharge port which sends out the refrigerant, a rotor forming a rotational body and controlling a flow of the refrigerant by rotating about a rotational axis at an inner portion of the housing, a first seal provided at the first inlet port and making contact with an outer surface of the rotor, the first seal including an annular form, and a second seal provided at the second inlet port and making contact with an outer surface of the rotor, the second seal including an annular form, the rotor including a receiving portion including a first receiving portion and a second receiving portion for receiving the refrigerant from the first inlet port, the first receiving portion being provided along an extending direction of the rotational axis and formed in a wide width, the second receiving portion being provided along the extending direction of the rotational axis and formed in a narrow width, an inner void accommodating the refrigerant which is received, and a bore portion provided to send out the refrigerant to the discharge port, at least a part of the second seal is configured to make contact with an edge portion of the first receiving portion in a case where at least a part of the first receiving portion is in communication with the second inlet port by a rotation of the rotor.

According to the aforementioned construction, in a case where the first receiving portion formed in the wide width reaches the position of the second inlet port by the rotation of the rotor, the state where the part of the second seal at an outer circumference thereof makes contact with the edge portion of the first receiving portion is maintained. Thus, the posture of the second seal is inhibited from being inappropriate or the second seal is inhibited form being disengaged. Because the first seal of the first receiving portion has a larger diameter than the second seal, a part of the first seal securely makes contact with an outer wall surface of the rotor so that the first seal may be stably supported with any rotation position of the rotor. As a result, while the size of the apparatus is inhibited from increasing, the refrigerant control valve apparatus which maintains improved sealing ability may be constructed.

In addition, according to the refrigerant control valve apparatus of the invention, the discharge port includes a center line passing through a center of a sphere forming the rotor, and the discharge port includes a discharge-side end portion inclined in a direction away from the inlet port.

For example, the center line of a discharge portion is assumed to be provided orthogonal to the rotational axis. In such assumption, a length corresponding to a diameter of the discharge portion in a direction along the rotational axis is required at the housing. Thus, it may be difficult to reduce dimensions of the housing. As compared to the above, according to the present construction, the center line of the discharge portion is inclined relative to the rotational axis in the inclined direction where the discharge-side end portion of the discharge portion is away from the inlet port. Thus, a region at an outer circumference of an opening of the discharge portion in the vicinity of the inlet port may be displaced in a direction away from the inlet port. As a result, the refrigerant control valve apparatus in a reduced size may be constructed.

In addition, according to the refrigerant control valve apparatus of the invention, the inlet port includes a center line passing through a center of a sphere forming the rotor, and the inlet port includes an inlet-side end portion inclined in a direction away from the discharge port.

For example, the center line of an inlet portion is assumed to be provided orthogonal to the rotational axis. In such assumption, a length corresponding to a diameter of the inlet portion in a direction along the rotational axis is required at the housing. Thus, it may be difficult to reduce dimensions of the housing. As compared to the above, according to the present construction, the center line of the inlet portion is inclined relative to the rotational axis in the inclined direction where the inlet-side end portion of the inlet portion is away from the inlet port. Thus, a region at an outer circumference of an opening of the inlet portion in the vicinity of the discharge portion may be displaced in a direction away from the discharge portion. As a result, the refrigerant control valve apparatus in a reduced size may be constructed.

In addition, according to the refrigerant control valve apparatus of the invention, a control case is mounted at an external portion of the housing, the control case specifying a rotation position of the rotor by a driving force of an actuator.

In the refrigerant control valve apparatus including specifications of three or more than three ports, for example, a seal of each of the ports makes contact with the rotor by a biasing force, which leads to a large resistance upon rotation driving of the rotor so that an improved driving force is desired. In light of the aforementioned drawback, according to the present construction, the control case is mounted at the external portion of the housing. Thus, the control case which obtains the driving force conforming to the aforementioned specifications (i.e., which includes a speed reduction ratio or a motor with the driving force, for example, conforming to the aforementioned specifications) may be mounted at the external portion of the housing. In addition, according to the present construction, the housing and the control case are individually constructed from each other. In a case where the refrigerant control valve apparatus is assembled, a process where the actuator and a speed reduction gear, for example, are assembled on the control case beforehand and a process where the rotor, for example, is mounted at the housing may be individually performed. A manufacturing process is simplified even in a case where the apparatus including various different specifications may be assembled.

In addition, according to the refrigerant control valve apparatus of the invention, in a case where the rotor is rotated about the rotational axis, a positional relation is specified so that a reference locus at an outer circumference of the second bore portion at one side in a direction along the rotational axis overlaps an outer circumference of the first bore portion, and an intermediate locus at the outer circumference of the second bore portion at the other side in the direction along the rotational axis reaches a center portion of the first bore portion. The first bore portion is provided with a rib portion which divides the first bore portion at the intermediate locus.

Accordingly, in a case where the first bore portion reaches the second seal by the rotation of the rotor, the outer circumference of the second seal at one side in the direction along the rotational axis makes contact with the edge portion of the first bore portion facing the reference locus, and the outer circumference of the second seal at the other side in the direction along the rotational axis makes contact with the rib portion. Thus, the position of the second seal is stabilized without unbalanced abrasion of the second seal, which may stably support the second seal.

In addition, according to the refrigerant control valve apparatus of the invention, in a case where the rotor is rotated about the rotational axis, a positional relation is specified so that a reference locus at an outer circumference of the second receiving portion at one side in a direction along the rotational axis overlaps an outer circumference of the first receiving portion, and an intermediate locus at the outer circumference of the second receiving portion at the other side in the direction along the rotational axis reaches a center portion of the first receiving portion. The first receiving portion is provided with a rib portion which divides the first receiving portion at the intermediate locus.

Accordingly, in a case where the first receiving portion reaches the second seal by the rotation of the rotor, the outer circumference of the second seal at one side in the direction along the rotational axis makes contact with the edge portion of the first receiving portion facing the reference locus, and the outer circumference of the second seal at the other side in the direction along the rotational axis makes contact with the rib portion. Thus, the position of the second seal is stabilized without unbalanced abrasion of the second seal, which may stably support the second seal.

In addition, according to the refrigerant control valve apparatus of the invention, the rib portion is provided being displaced in a direction of the rotational axis relative to an imaginary outer wall surface which is obtained by an extension of an outer wall portion of the rotor for restraining a contact pressure with the first seal.

Accordingly, even in a state where the rib portion makes contact with the first seal with the rotation of the rotor, the rib portion and the first seal lightly make contact with each other. Thus, inconvenience where the rib portion and the first seal strongly make contact with each other, which leads to abrasion of the rib portion and the first seal, is avoidable.

In addition, according to the refrigerant control valve apparatus of the invention, the rib portion includes a center region which is displaced in the direction of the rotational axis relative to the imaginary outer wall surface at a center of the rotor in a circumferential direction thereof and an inclined region where an outer end portion of the rib portion is gently inclined to be connected to the center region and the outer wall portion of the rotor.

Accordingly, in a case where the first seal is shifted to a state making contact with the rib portion with the rotation of the rotor, the first seal relatively moves from the inclined region to the center region of the rib portion. Thus, a smooth rotation of the rotor is obtainable and abrasion of the first seal is restrained.

In addition, according to the refrigerant control valve apparatus of the invention, the rotor includes an outer wall portion in a spherical form with reference to a wall center on the rotational axis.

Accordingly, in a case where the rotor is in the rotation position closing the first discharge port, an entire circumference of the first seal makes close contact with the outer wall portion of the rotor. In a case where the rotor is in the rotation position closing the second discharge port, an entire circumference of the second seal makes close contact with the outer wall portion of the rotor. Thus, improved sealing ability is achieved.

In addition, according to the refrigerant control valve apparatus of the invention, the bore portion includes a groove which extends to a side where the bore portion starts overlapping the discharge port with the rotation of the rotor.

Accordingly, before the bore portion overlaps the discharge port, the groove overlaps the discharge port so that the refrigerant is supplied to the discharge port via the groove. In a case where supply of the refrigerant to a radiator of the internal combustion engine is started, for example, a small amount of the refrigerant is supplied via the groove before starting the supply of the refrigerant via the discharge port. The temperature of the refrigerant may be slightly changed before the refrigerant is supplied from the discharge port, which may restrain a rapid change in temperature of the internal combustion engine.

In addition, according to the refrigerant control valve apparatus of the invention, the receiving portion includes a groove which extends to a side where the receiving portion starts overlapping the inlet port with the rotation of the rotor.

Accordingly, before the receiving portion overlaps the inlet port, the groove overlaps the inlet port so that the refrigerant is supplied to the inlet port via the groove. In a case where supply of the refrigerant to a radiator of the internal combustion engine is started, for example, a small amount of the refrigerant is supplied via the groove before starting the supply of the refrigerant via the inlet port. The temperature of the refrigerant may be slightly changed before the refrigerant is supplied from the inlet port, which may restrain a rapid change in temperature of the internal combustion engine.

In addition, according to the refrigerant control valve apparatus of the invention, a stopper is provided projecting at a region in an outer circumference of the rotor, the region at which the stopper is inhibited from making contact with the first seal and the second seal, the stopper determining a rotation limit of the rotor.

It is considerable that the stopper which projects from the outer circumference of the rotor for determining a rotation limit of the rotor is integrally provided with the rotor. Nevertheless, in a resin molding with a die, a time period for heat radiation at the stopper portion of which amount of resin is large is longer than a time period for heat radiation at the outer wall portion of which amount of resin is small. Because of the aforementioned reason, after the molding, shrinkage in conjunction with the heat radiation is continued at the stopper portion even after shrinkage in conjunction with the heat radiation at the outer wall portion of the rotor is finished. As a result, it is considerable that a thickness of the outer wall portion in the vicinity of the stopper becomes thinner than a necessary value, which leads to a recess portion at an outer peripheral surface of the rotor and decreases the sealing ability of the seal. On the other hand, in the present construction as mentioned above, the stopper is provided at the region where the stopper is inhibited from making contact with the first seal and the second seal. Even when the recess portion is provided in the vicinity of the stopper at the outer circumference of the rotor, the sealing ability is inhibited from decreasing.

In addition, according to the refrigerant control valve apparatus of the invention, the second bore portion includes a longitudinal rib portion extending in an extending direction of a rotational shaft, the longitudinal rib portion being retracted towards a center of the rotational shaft relative to an imaginary outer wall surface obtained by an extension of an outer wall portion of the rotor for restraining a contact pressure with the first seal.

Accordingly, the configuration of the second bore portion is maintainable by the longitudinal rib portion, which may inhibit a desired flow of refrigerant from varying. In addition, a gap may be formed between the longitudinal rib portion and the first seal portion upon rotation of the rotor. Thus, a contact pressure of the longitudinal rib portion relative to the first seal is reduced to restrain abrasion of the first seal and to increase a lifetime of the first seal. Desired sealing ability may be maintained, which inhibits increase of leakage of the refrigerant. Further, because the longitudinal rib portion is inhibited from sliding relative to the first seal, sliding torque may be reduced.

In addition, according to the refrigerant control valve apparatus of the invention, the second receiving portion includes a longitudinal rib portion extending in an extending direction of a rotational shaft, the longitudinal rib portion being retracted towards a center of the rotational shaft relative to an imaginary outer wall surface obtained by an extension of an outer wall portion of the rotor for restraining a contact pressure with the first seal.

Accordingly, the configuration of the second receiving portion is maintainable by the longitudinal rib portion, which may inhibit a desired flow of refrigerant from varying. In addition, a gap may be formed between the longitudinal rib portion and the first seal portion upon rotation of the rotor. Thus, a contact pressure of the longitudinal rib portion relative to the first seal is reduced to restrain abrasion of the first seal and to increase a lifetime of the first seal. Desired sealing ability may be maintained, which inhibits increase of leakage of the refrigerant. Further, because the longitudinal rib portion is inhibited from sliding relative to the first seal, sliding torque may be reduced.

BRIEF DESCRIPTION OF DRAWINGS

FIG. 31 is a cross-sectional view of the refrigerant control valve apparatus according to still another embodiment (d).

MODE FOR CARRYING OUT THE INVENTION

Embodiments of the present invention are explained with reference to the attached drawings.

First Embodiment: Basic Construction

Figure 1:
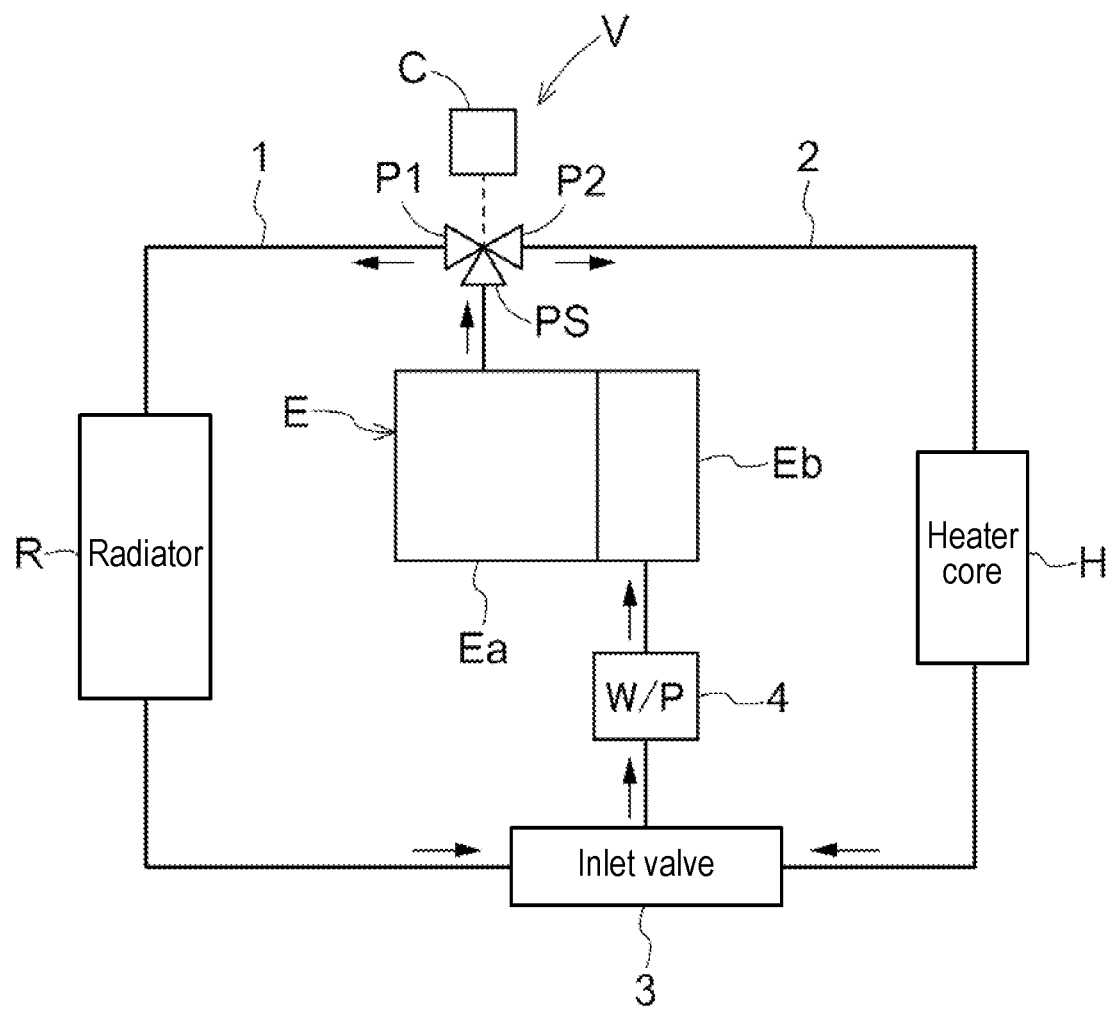
FIG. 1 is a diagram illustrating an engine cooling system according to a first embodiment.

A refrigerant control valve apparatus V includes, as illustrated in FIG. 1, an inlet port PS, a first discharge port P1 and a second discharge port P2. The inlet port PS receives coolant water (an example of refrigerant) from an engine E serving as an internal combustion engine mounted at a vehicle. The first discharge port P1 sends the coolant water to a radiator R via a radiator hose 1. The second discharge port P2 sends the coolant water to a heater core H via a heater hose 2. The engine E includes a cylinder head portion Ea and a cylinder block portion Eb. The coolant water is supplied from the cylinder head portion Ea to the inlet port PS of the refrigerant control valve apparatus V. The coolant water supplied to the radiator R and the coolant water supplied to the heater core H are sent to a water pump 4 (W/P) from an inlet valve 3 and are returned to the cylinder block portion Eb of the engine E from the water pump 4.

In the first embodiment, the coolant water from the refrigerant control valve apparatus V is supplied to the radiator R and the heater core H. Instead, the coolant water from the refrigerant control valve apparatus V may be utilized to be supplied for heat exchange of engine oil or fluid for an automatic transmission, for example. In a case where the coolant water is utilized in the aforementioned way, a third discharge port may be provided at the refrigerant control valve apparatus V.

Figure 2:
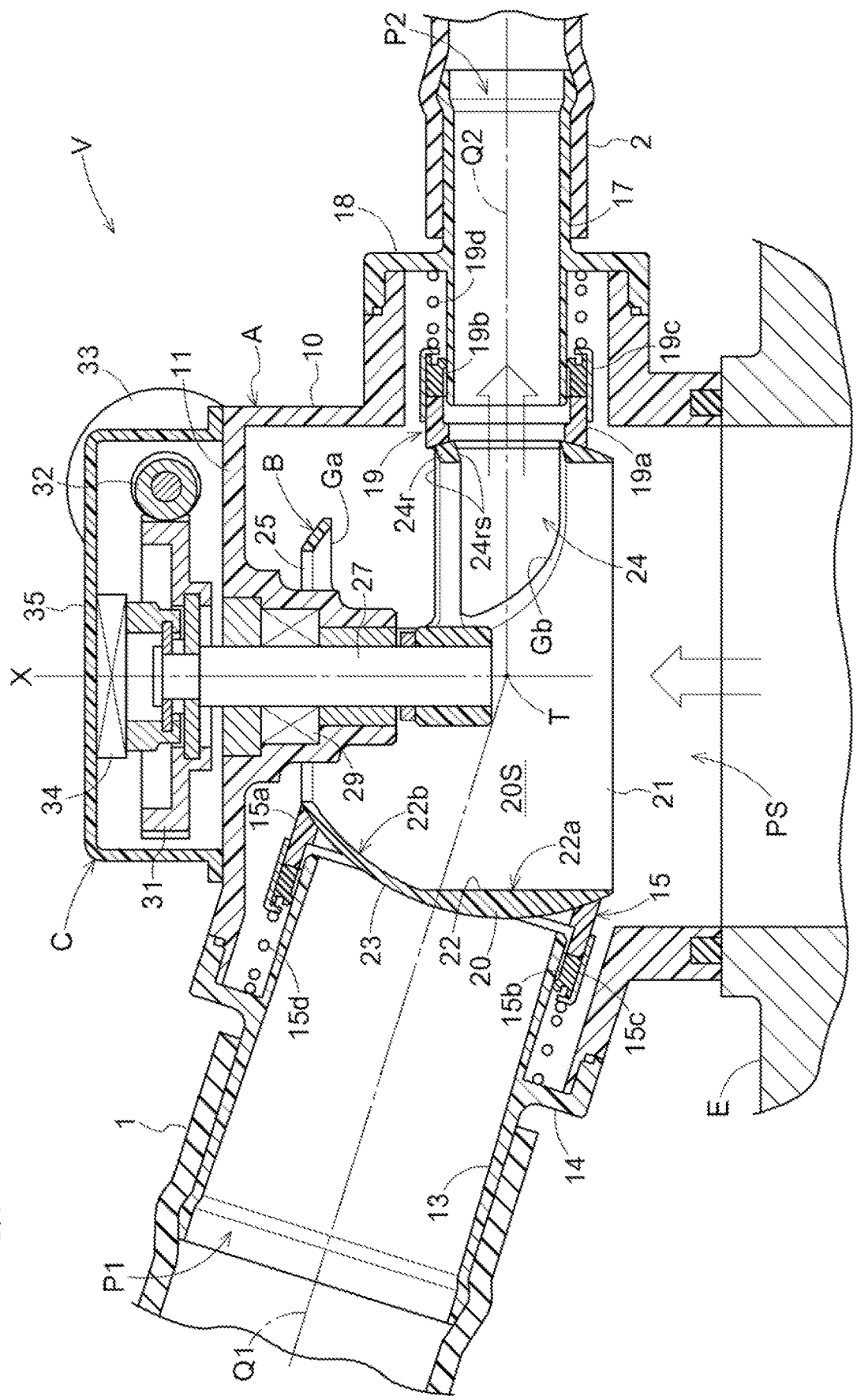
FIG. 2 is a longitudinal cross-sectional view of a refrigerant control valve apparatus in which coolant water is sent to a second discharge port.
Figure 3:
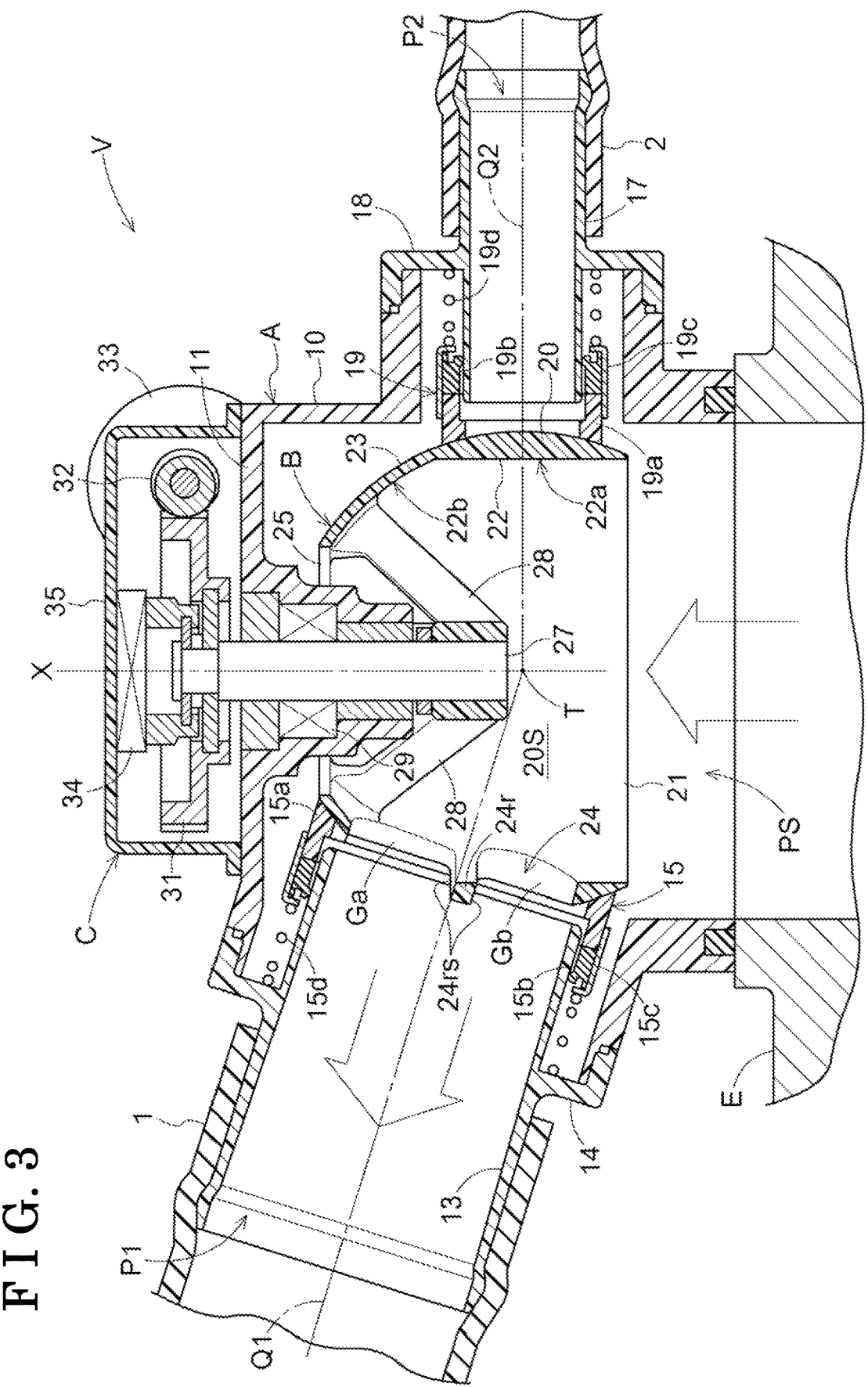
FIG. 3 is a longitudinal cross-sectional view of the refrigerant control valve apparatus in which the coolant water is sent to a first discharge port.
Figure 4:
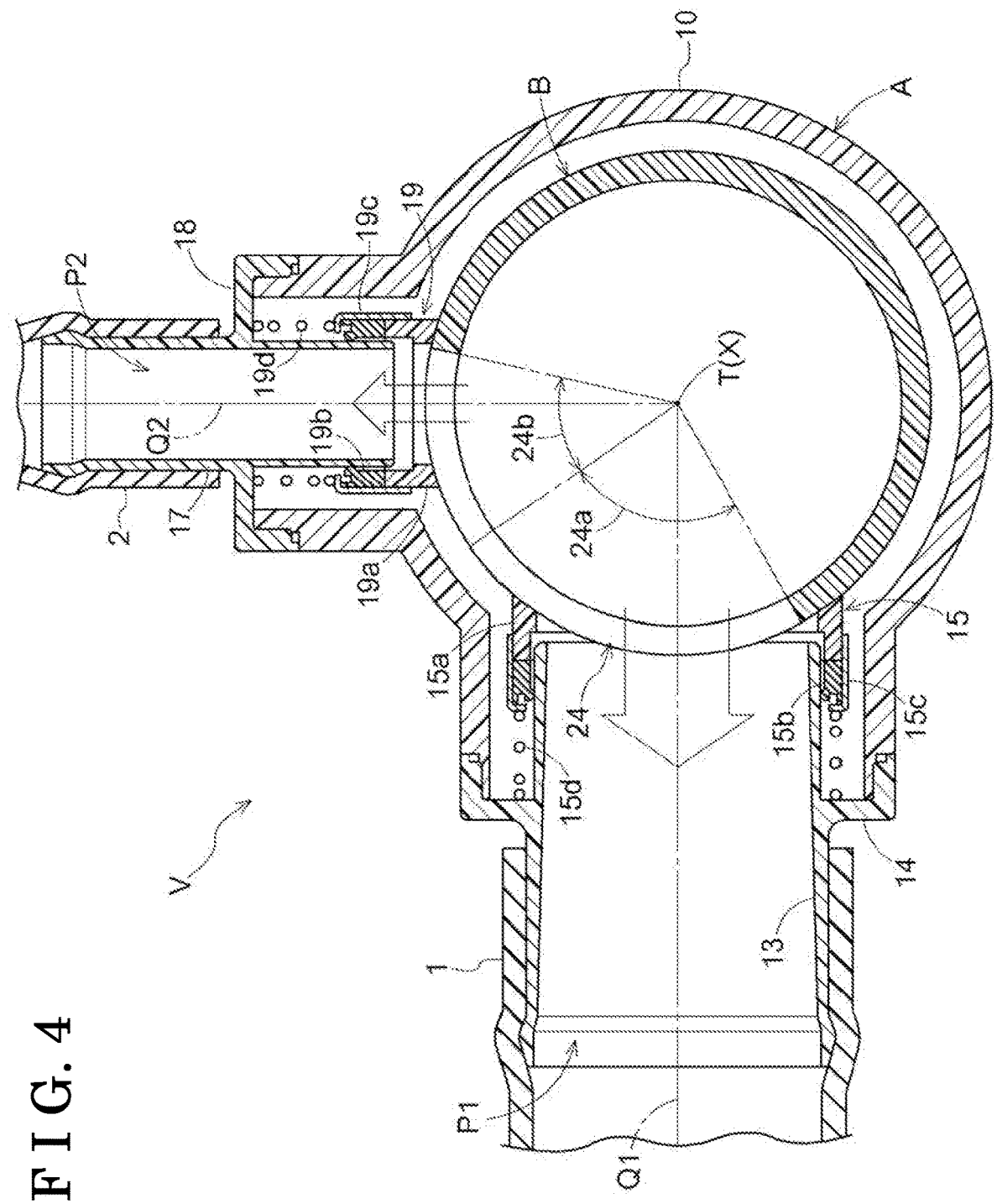
FIG. 4 is a lateral cross-sectional view of the refrigerant control valve apparatus.

As illustrated in FIGS. 2 to 4, the refrigerant control valve apparatus V includes a housing A made of resin, a rotor B made of resin, and an electric control portion C. The rotor B is housed at an inner portion of the housing A so as to be rotatable about a rotational axis X. The rotor B includes an outer wall portion 23 in a spherical form. The electric control portion C drives and rotates the rotor B. The refrigerant control valve apparatus V is configured to establish a state where the coolant water (the example of the refrigerant) of the engine E is supplied to at least one of the radiator R and the heater core H serving as a device which requires heat and a state where the coolant water is supplied neither to the radiator R nor the heater core H. The rotational axis X is specified to be orthogonal to an opening surface of the inlet port PS from a center position of the inlet port PS.

[Housing]

The housing A includes a housing plate 11 in a cover form so as to close one end portion of a housing body 10 in a tubular form. The inlet port PS is provided at an opening side of the housing body 10.

The first discharge port P1 includes a first sleeve portion 13 (an example of a first member) in a cylindrical form connected to the radiator hose 1, a first flange portion 14 provided at an outer periphery of the first sleeve portion 13 so as to form a flange, and a first seal portion 15 externally fitted to an inner end of the first sleeve portion 13.

The first flange portion 14 is connected to the housing body 10 via an outer circumference thereof entirely by welding. The first seal portion 15 includes an annular first seal 15a, a first packing 15b, a first intermediate ring 15c and a first spring 15d. The first seal 15a, the first packing 15b, the first intermediate ring 15c and the first spring 15d are provided so as to be externally fitted at an inner end position of the first sleeve portion 13. The first flange portion 14 may be adhered to the housing body 10 by adhesive agent, instead of welding.

The first seal portion 15 makes close contact with the outer wall portion 23 in the spherical form over an entire circumference of the first seal portion 15 in a case where the rotor B is specified in a position closing the first discharge port P1. As a result, a flow of coolant water between the first discharge port P1 and the outer wall portion 23 of the rotor B is blocked.

The first seal 15a is annularly formed of flexible resin such as PTFE (polytetrafluoroethylene), for example. The first seal 15a is movable along a first center line Q1 of the first sleeve portion 13 in a state being externally fitted to the first sleeve portion 13. The first packing 15b, which is annularly formed of flexible resin, is provided with a rip portion at an inner circumferential side, the rip portion making contact with an outer peripheral surface of the first sleeve portion 13. The first packing 15b is movable along the first center line Q1 of the first sleeve portion 13.

The first intermediate ring 15c is made of metal or resin with high rigidity and is arranged at a position being externally fitted to the first packing 15b. The first spring 15d is formed of metallic material and is disposed at a position where one end of the first spring 15d makes contact with the first flange portion 14 and the other end of the first spring 15d makes contact with the first intermediate ring 15c. Because of biasing force of the first spring 15d, the first seal 15a makes contact with the outer wall portion 23 of the rotor B.

Specifically, the first center line Q1 serving as a center of the first sleeve portion 13 is inclined relative to the rotational axis X. The first center line Q1 intersects with the rotational axis X. The position where the first center line Q1 intersects with the rotational axis X serves as a wall center T which matches a center of the outer wall portion 23 in the spherical form of the rotor B. The inclined direction of the first center line Q1 is specified so that an outer end side of the first sleeve portion 13 is away from the rotational axis X and away from the inlet port PS towards a downstream of flow of coolant water at the first sleeve portion 13.

The second discharge port P2 includes a second sleeve portion 17 (an example of a second member) connected to the heater hose 2, a second flange portion 18 provided at an outer periphery of the second sleeve portion 17 so as to form a flange, and a second seal portion 19 externally fitted to an inner end of the second sleeve portion 17.

The second flange portion 18 is connected to the housing body 10 via an outer circumference thereof entirely by welding. The second seal portion 19 includes an annular second seal 19a, a second packing 19b, a second intermediate ring 19c and a second spring 19d. The second seal 19a, the second packing 19b, the second intermediate ring 19c and the second spring 19d are provided so as to be externally fitted at an inner end position of the second sleeve portion 17. The second flange portion 18 may be adhered to the housing body 10 by adhesive agent, instead of welding.

The second seal portion 19 makes close contact with the outer wall portion 23 in the spherical form over an entire circumference of the second seal portion 19 in a case where the rotor B is specified in a position closing the second discharge port P2. As a result, a flow of coolant water between the second discharge port P2 and the outer wall portion 23 of the rotor B is blocked.

The second seal 19a, the second packing 19b, the second intermediate ring 19c and the second spring 19d constituting the second seal portion 19 are made of the same materials as the corresponding members at the first seal portion 15 and function in the same manner as the first seal portion 15.

Specifically, a second center line Q2 serving as a center of the second sleeve portion 17 is specified so as to be inclined relative to the rotational axis X. The second center line Q2 is disposed at a position intersecting with the rotational axis X at the wall center T. The second center line Q2 is arranged at a position overlapping a position at the outer wall portion 23 including the largest outer diameter with reference to the rotational axis X.

Further, a relative positional relation between the first discharge port P1 and the second discharge port P2 is specified so that an outer circumferential portion of the first seal 15a facing the inlet port PS and an outer circumferential portion of the second seal 19a facing the inlet port PS match each other in the direction along the rotational axis X.

[Rotor]

As illustrated in FIGS. 2 to 4 and 9, the rotor B includes a rotor body 20 which integrally rotates with a shaft 27 arranged coaxially with the rotational axis X.

The rotor body 20 includes an opening portion 21, a rotor inner wall portion 22, the outer wall portion 23 and a control bore portion 24 (a detailed example of a bore portion). The opening portion 21 serves as a receiving portion that receives the coolant water from the inlet port PS by opening in the direction along the rotational axis X. The rotor inner wall portion 22 continues to the opening portion 21 to define an inner void 20S at an inner portion of the rotor body 20. The outer wall portion 23 includes the spherical form with reference to the wall center T. The control bore portion 24 is provided at the outer wall portion 23 so as to send out the coolant water from the inner void 20S of the rotor B to the first discharge port P1 or the second discharge port P2.

In the rotor body 20, an opening portion 25 arranged at an opposite side from the opening portion 21 is provided in a state where the shaft 27 penetrates through the opening portion 25. Plural connecting bodies 28 provided at a projection end of the shaft 27 are connected to the rotor inner wall portion 22 of the rotor body 20 so as to integrally rotate with the rotor B.

The rotor inner wall portion 22 includes an inlet inner wall portion 22a and a curving inner wall portion 22b. The inlet inner wall portion 22a continues from the opening portion 21 in the direction along the rotational axis X. The curving inner wall portion 22b smoothly continues from the inlet inner wall portion 22a to extend in a direction where the inlet inner wall portion 22a becomes narrow towards the opposite side from the opening portion 21. Accordingly, the inner void 20S of the rotor B is constituted so that the region of the curving inner wall portion 22b is provided in parallel with the outer wall portion 23 and the region of the inlet inner wall portion 22a is formed in a tubular form with a predetermined thickness. The opening portion 25 is provided at the curving inner wall portion 22b.

As illustrated in FIGS. 5 to 9, the control bore portion 24 is configured by a series of a first bore portion 24a including a slightly narrower width than an inner diameter of the first seal 15a of the first discharge port P1 and a second bore portion 24b including a slightly narrower width than an inner diameter of the second seal 19a of the second discharge port P2, the first bore portion 24a and the second bore portion 24b extending along an outer periphery of the rotor body 20. A groove 24T which extends to a side where the groove 24T starts overlapping the first discharge port P1 with the rotation of the rotor B is provided at an outer circumference of the first bore portion 24a of the control bore portion 24. The groove 24T is provided by cutting a part of an outer circumferential edge of a main elongated bore portion Ga constituting the first bore portion 24a. The groove 24T may be provided at an outer circumference of an auxiliary elongated bore portion Gb constituting the first bore portion 24a.

In a case where the rotor B is rotated about the rotational axis X, a reference locus Ka at an outer circumference of the second bore portion 24b at one side in the direction along the rotational axis X (at a lower side closer to the opening portion 21 in FIG. 5) overlaps the outer circumference of the first bore portion 24a. In addition, a positional relationship is specified so that an intermediate locus Kb at the outer circumference of the second bore portion 24b at the other side in the direction along the rotational axis X (at an upper side in FIG. 5) reaches a center portion of the first bore portion 24a in the direction along the rotational axis X.

A first width W1 (i.e., a width in the direction along the rotational axis X) of the first bore portion 24a is approximately twice as large as a second width W2 (i.e., a width in the direction along the rotational axis X) of the second bore portion 24b. In addition, a rib portion 24r is provided along the aforementioned intermediate locus Kb at the first bore portion 24a so as to evenly divide the first bore portion 24a into two in the width direction thereof.

The rib portion 24r is configured to evenly divide the first bore portion 24a into two in the width direction thereof as mentioned above. Thus, in a case where the first discharge port P1 is opened, the coolant water flows along an end surface 24rs of the rib portion 24r constituting an outer edge portion of the main elongated bore portion Ga and an end surface 24rs of a rib portion 24r constituting an outer edge portion of the auxiliary elongated bore portion Gb. Each of the end surfaces 24rs is formed in a flat surface positioned along the flow of the coolant water so as not to serve as a resistance against the flow of the coolant water.

Because the rib portion 24r is provided in the aforementioned manner, even in a case where the second seal 19a of the second discharge port P2 reaches the first bore portion 24a based on setting of a rotation position of the rotor B, the second seal 19a is brought to a state making contact with an opening edge of the first bore portion 24a and the rib portion 24r. The second seal 19a is stably supported accordingly. Because the rib portion 24r is provided in such manner, the main elongated portion Ga (at an upper side than the rib portion 24r in FIG. 5) and the auxiliary elongated portion Gb (at a lower side than the rib portion 24r in FIG. 5) are provided in parallel to each other. Further, in a case where the coolant water flows in the vicinity of the rib portion 24r, each of the end surfaces 24rs thereof is formed smoothly in the position along the flow of the coolant water, so that the smooth flow of the coolant water is obtainable.

Figure 9:
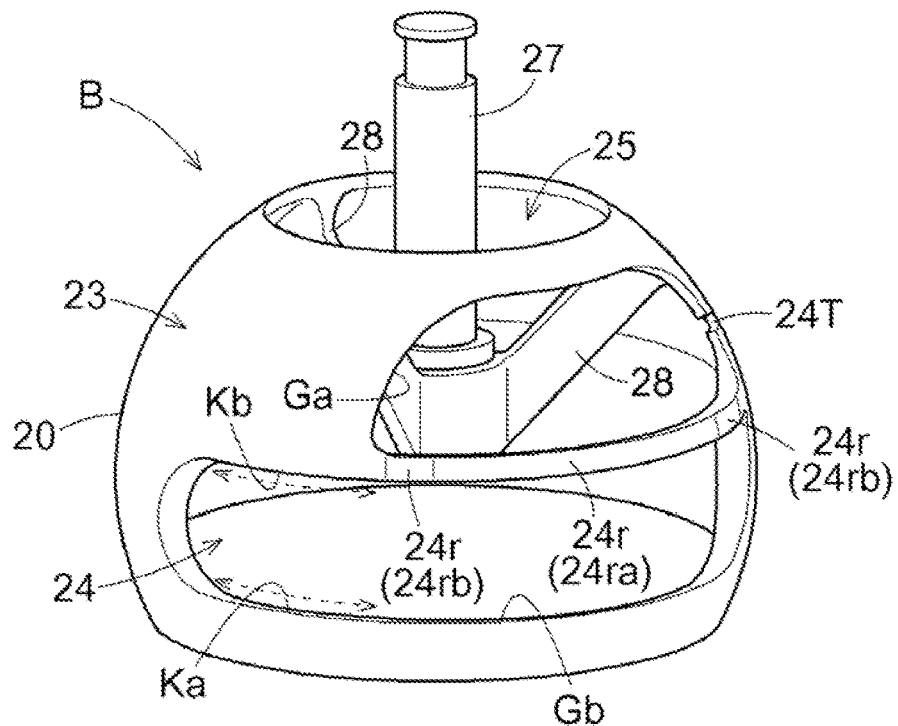
FIG. 9 is a perspective view of the rotor.
Figure 10:
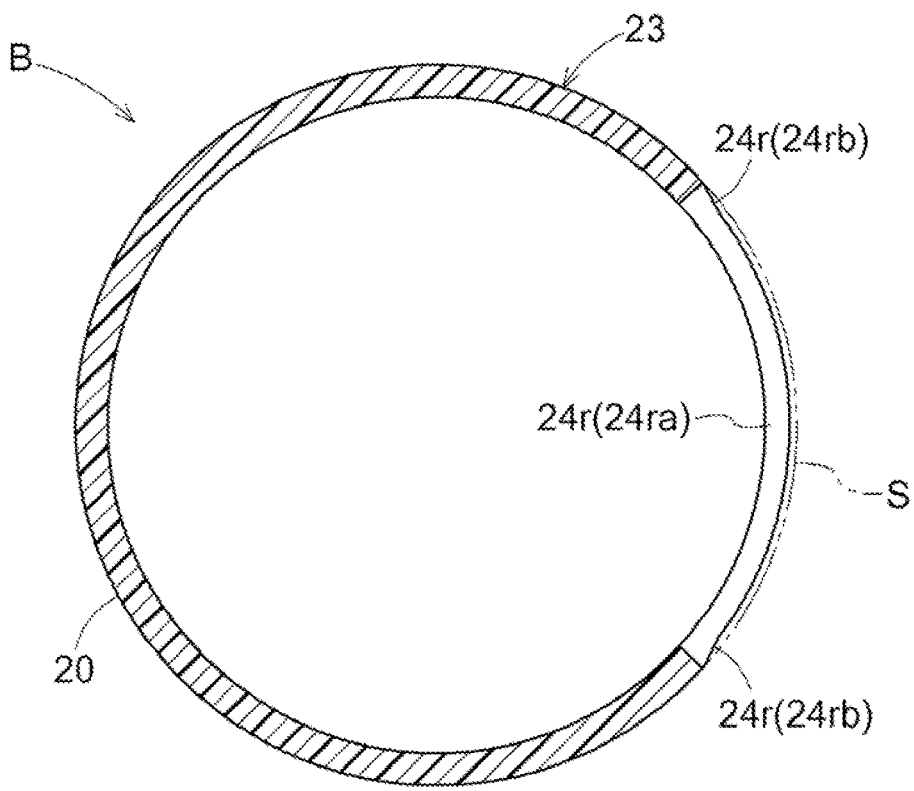
FIG. 10 is a cross-sectional view illustrating a relationship between an imaginary outer wall surface and a rib portion.

Specifically, as illustrated in FIGS. 9 and 10, the rib portion 24r is displaced in the direction of the rotational axis X relative to an imaginary outer wall surface S which is obtained by an extension of the outer wall portion 23 so that a contact pressure is inhibited from being locally applied to the first seal 15a of the first discharge port P1 from the rib portion 24r. The rib portion 24r is constituted so that a center region 24ra in a circumferential direction of the rib portion 24r is most displaced in the direction of the rotational axis X from the imaginary outer wall surface S. In addition, inclined regions 24rb are provided at opposed outer end portions of the rib portion 24r so that the center region 24ra and the outer wall portion (an edge portion of the first bore portion 24a) of the rotor B are continued with a smooth inclination of each of the outer end portions of the rib portion 24r in the circumferential direction thereof. According to the aforementioned construction, the contact pressure of the rib portion 24r relative to the first seal 15a is reduced to restrain abrasion of the first seal 15a and to increase a lifetime of the first seal 15a. Further, because the inclined regions 24rb are provided at opposed ends of the center region 24ra of the rib portion 24r, the smooth rotation of the rotor B is obtained to further increase the lifetime of the first seal 15a.

[Electric Control Portion]

The shaft 27 is supported at the housing plate 11 so as to be rotatable thereto in a state penetrating through the housing plate 11 of the housing A. A seal 29 is provided between the shaft 27 and a boss portion of the housing plate 11 so as to inhibit leakage of the coolant water.

The electric control portion C is configured in a state where a wheel gear 31 provided at an end portion of the shaft 27, a worm gear 32 meshed with the wheel gear 31, an electric motor 33 (an example of an actuator) driving and rotating the worm gear 32, and a rotation angle sensor 34 of a non-contact type detecting a rotation position of the rotor B based on a rotation position of the worm gear 32 are housed in a control case 35.

The control case 35 is connected and fixed to the housing body 10 so as to have a watertight configuration. The electric motor 33 is controlled by an external control unit. The control unit specifies a target position of the rotor B based on a detection result of a water temperature sensor which measures the temperature of the coolant water of the engine E and information on necessity of the heater core H. The control unit controls the rotor B so that the rotation position thereof achieves the target position based on a detection signal of the rotation angle sensor 34.

The control case 35 is provided as a separate member from the housing body 10 and is coupled and fixed to an outer surface of the housing body 10. Thus, even in a case where the refrigerant control valve apparatus V including different specifications is manufactured, for example, the number of components is inhibited from increasing because the housing body 10 and the electric control portion C are individually manufactured.

[Control of Coolant Water]

The electric control portion C realizes control to specify the rotation position of the rotor B to a fully open position at which the first discharge port P1 and the second discharge port P2 are simultaneously opened, a second open position at which the second discharge port P2 is only opened, a first open position at which the first discharge port P1 is only opened, and a fully closed position at which the first discharge port P1 and the second discharge port P2 are simultaneously closed.

Figure 5:
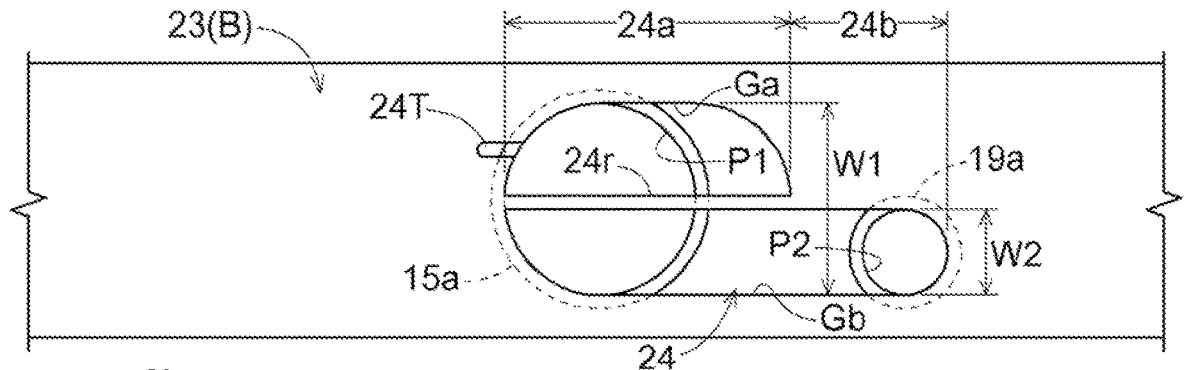
FIG. 5 is a development view of a rotor in a fully open position.

That is, in a case where the rotation position of the rotor B is specified at the fully open position, as illustrated in FIG. 5, the first discharge port P1 and the second discharge port P2 are in communication with the inner void 20S. The coolant water is supplied from the first discharge port P1 to the radiator R and is simultaneously supplied from the second discharge port P2 to the heater core H. At the fully open position, the first seal 15a makes contact with a pair of edge portions of the first bore portion 24a while the second seal 19a makes contact with a pair of edge portions of the second bore portion 24b. Thus, both the positions of the first seal 15a and the second seal 19a are stabilized.

Figure 6:
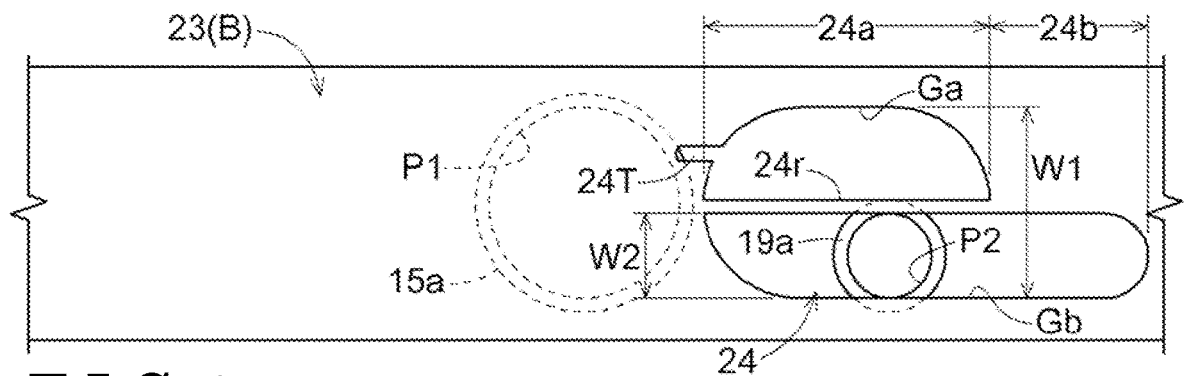
FIG. 6 is a development view of the rotor in a second open position.

In addition, in a case where the rotor B is operated to rotate in one direction based on from the fully open position so as to be specified at the second open position, the second discharge port P2 and the inner void 20S are communicated with each other as illustrated in FIG. 6. Thus, the coolant water is able to be supplied to the heater core H. In the second open position, the position of the second seal 19a is stabilized because the second seal 19a reaches the position of the first bore portion 24a by moving along the auxiliary elongated bore portion Gb, and one side of an outer circumference of the second seal 19a makes contact with the edge portion of the first bore portion 24a while the other side of the outer circumference of the second seal 19a makes contact with the rib portion 24r.

Specifically, in a case where the rotor B rotates from the second open position illustrated in FIG. 6 to the fully open position illustrated in FIG. 5, the groove 24T overlaps the first discharge port P1 in conjunction with the aforementioned rotation of the rotor B. Thus, a small amount of coolant water may be supplied to the first discharge port P1 via the groove 24T at an early stage of the rotation. As a result, before the first bore portion 24a reaches a state overlapping the first discharge port P1, the temperature of the engine E is slightly changed, so that variations in temperature in a case where the coolant water is supplied via the first discharge port P1 are reduced to restrain a rapid change in temperature of the engine E.

Figure 7:
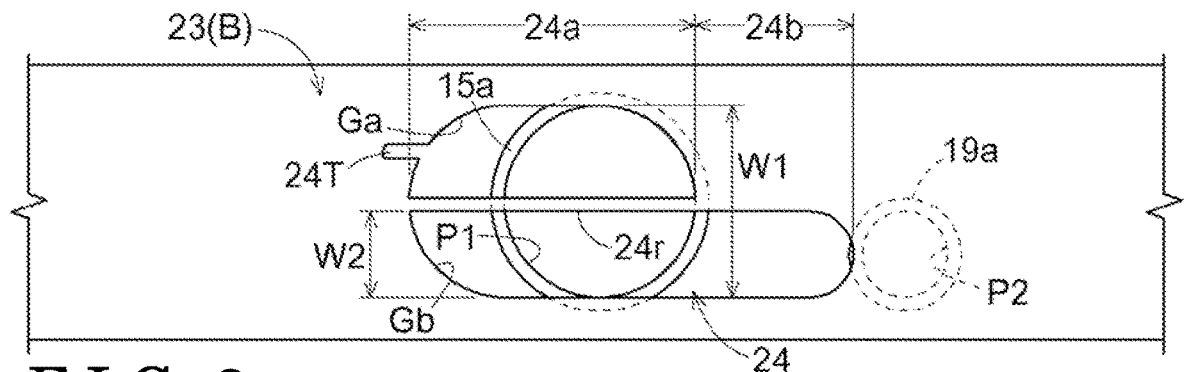
FIG. 7 is a development view of the rotor in a first open position.

In a case where the rotor B is operated to rotate in the other direction based on from the fully open position so as to be specified at the first open position, the first discharge port P1 and the inner void 20S are communicated with each other as illustrated in FIG. 7. Thus, the coolant water is able to be supplied to the radiator R. In the first open position, the position of the first seal 15a is stabilized in a state where the first seal 15a makes contact with the pair of edge portions of the first bore portion 24a (i.e., the edge portion of the main elongated bore portion Ga and the edge portion of the auxiliary elongated bore portion Gb) because the first seal 15a is positioned at the first bore portion 24a.

Figure 8:
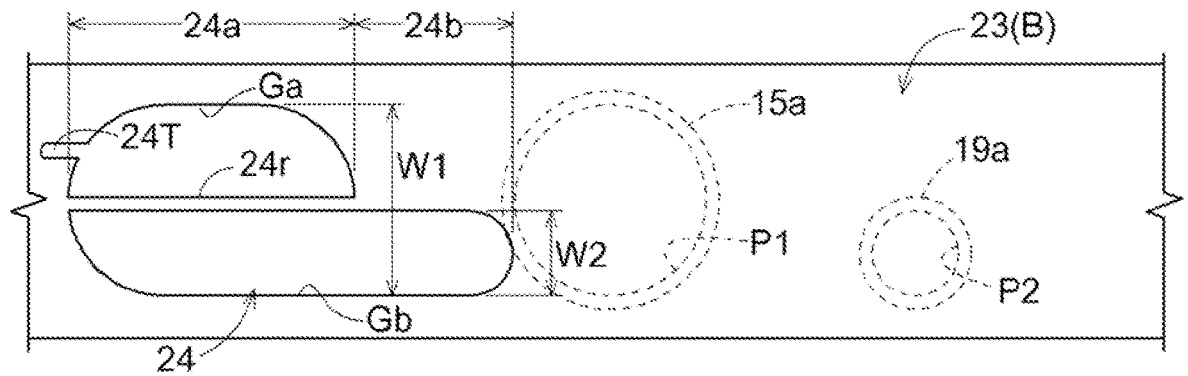
FIG. 8 is a development view of the rotor in a fully closed position.

Further, in a state where the rotor B is specified at the fully closed position, neither the first discharge port P1 nor the second discharge port P2 is in communication with the inner void 20S as illustrated in FIG. 8, so that the coolant water is inhibited from being supplied to each of the radiator R and the heater core H. The fully closed position is established in a case where an early warm-up is necessary such as immediately after the start of the engine E, for example. In the fully closed position, the first seal 15a makes close contact with the outer wall portion 23 of the rotor B and the second seal 19a makes close contact with the outer wall portion 23 of the rotor B.

The electric control portion C is also constructed so as to arbitrary specify a supply amount of coolant water in a state where the flow of the coolant water is limited at each of the first discharge port P1 and the second discharge port P2 (i.e., in a state of not being fully opened) by the setting of the rotation position of the rotor B.

Figure 11:
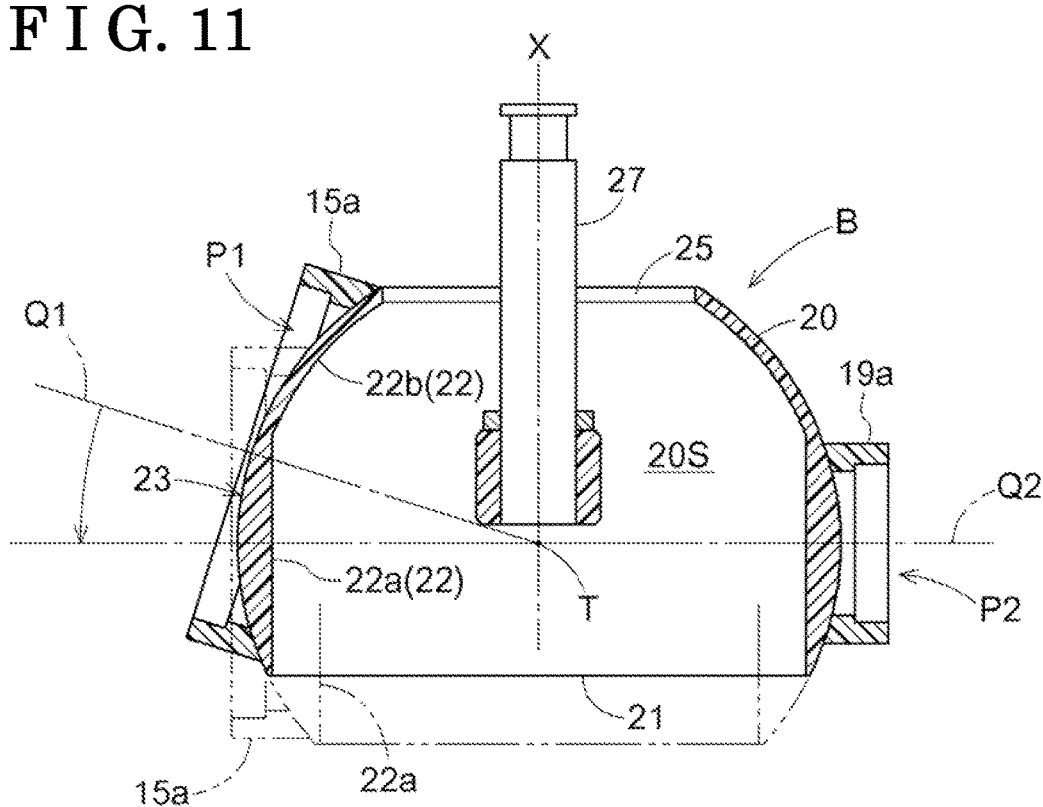
FIG. 11 is a cross-sectional view explaining a relationship between the rotor and a first seal.

For example, it is assumed that the position of the first center line Q1 of the first discharge port P1 is specified orthogonal to the rotational axis X by displacing the position of the first center line Q1 to rotate in an arrow direction with reference to the wall center T as illustrated in FIG. 11. In the aforementioned assumption, the first center line Q1 intersects the position at the outer wall portion 23 of the rotor B at which the diameter is the largest. The position of the first seal 15a is displaced in a direction closer to the opening portion 21 (in a lower direction in FIG. 11) as indicated by an imaginary line (an alternate long and two short dashes line) in FIG. 11 as compared to the position of the first seal 15a indicated by a solid line.

In the aforementioned displaced first seal 15a, a part of the first seal 15a makes contact with the outer wall portion 23 positioned in a direction towards the opening portion 21 relative to the portion of the outer wall portion 23 including the largest diameter with reference to the rotational axis X. In the aforementioned contact position, a region for the contact of the first seal 15a is necessarily provided by the outer wall portion 23 that is elongated towards the opening portion 21 along the rotational axis X. The outer wall portion 23 of the rotor B is constructed to be elongated along the rotational axis X. As a result, dimensions of the rotor B in the direction along the rotational axis increase while an inner diameter of the inlet inner wall portion 22a of the rotor inner wall portion 22 decreases as indicated by an imaginary line (an alternate long and two short dashes line) in FIG. 11.

On the other hand, the position of the first center line Q1 is inclined relative to the rotational axis X so that the first discharge port P1 of the embodiment is away from the opening portion 21 towards the downstream side of the flow of the coolant water. Accordingly, the portion in the first seal 15a of the first discharge port P1 closer to the opening portion 21 is positioned closer to the position at the outer wall portion 23 of the rotor B including the largest diameter with reference to the rotational axis X. As a result, the dimensions of the rotor B in the direction along the rotational axis X of the refrigerant control valve apparatus V are reduced to realize downsizing thereof. In addition, an inlet amount of coolant water may increase due to the large diameter of the inlet inner wall portion 22a.

Further, the first discharge port P1 and the second discharge port P2 are arranged next to each other in the circumferential direction at the housing A. Thus, as compared to a case where the first discharge port P1 and the second discharge port P2 are arranged next to each other in the direction along the rotational axis X, for example, decrease in dimensions of the housing A and the rotor B in the direction along the rotational axis X is achieved.

In the refrigerant control valve apparatus V, a cross-sectional area of the opening of the inlet port PS is specified to be greater than a value of a sum of a cross-sectional area of the first discharge port P1 and a cross-sectional area of the second discharge port P2. In addition, the coolant water from the inlet port PS is linearly sent to the inlet inner wall portion 22a at the rotor inner wall portion 22 constituting the inner void 20S of the rotor B and sent to be guided to the rotational axis X at the curving inner wall portion 22b. Thus, generation of stagnation of the coolant water is inhibited and the coolant water may flow smoothly. In the refrigerant control valve apparatus V, the coolant water supplied from the inlet port PS fills not only the inner void 20S of the rotor B but also the outside of the rotor B.

Second Embodiment

In a second embodiment, the refrigerant control valve apparatus V including the common construction to the aforementioned embodiment is utilized. In the second embodiment, a flow direction of the coolant water (the example of the refrigerant) is reversed and constructions of the first seal portion 15 and the second seal portion 19 are different from the aforementioned embodiment. In the second embodiment, configurations different from those of the first embodiment are extracted and explained. The configurations common to the aforementioned first embodiment bear the common reference numerals thereto.

Second Embodiment: Basic Construction

Figure 12:
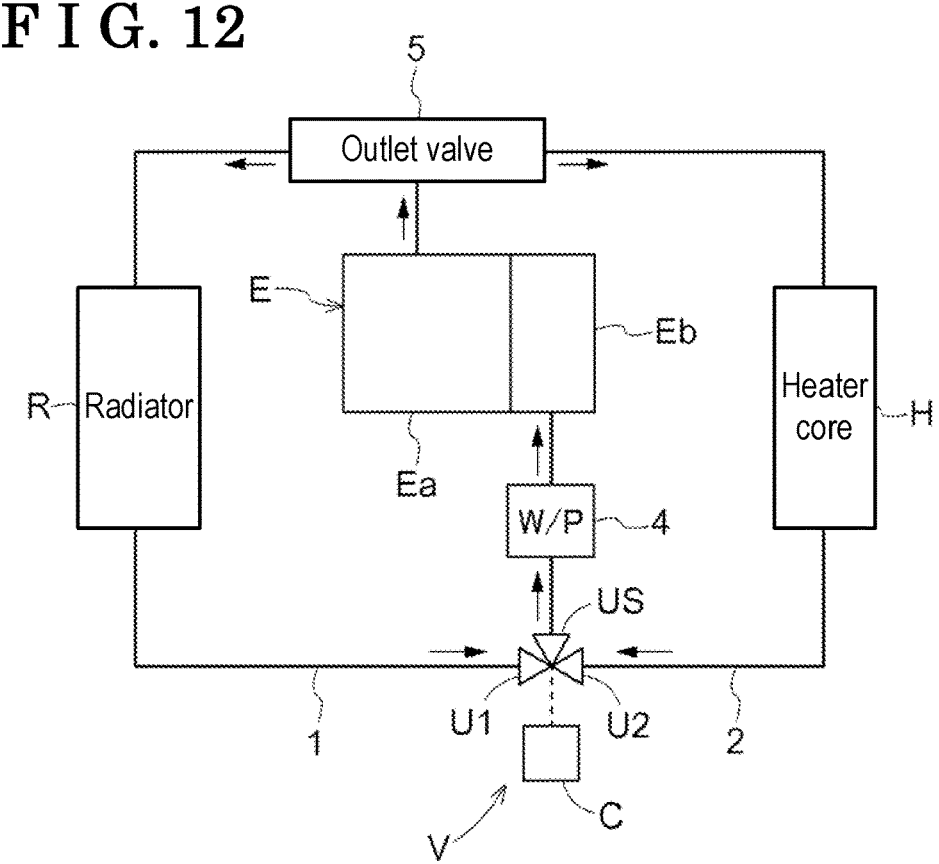
FIG. 12 is a diagram illustrating the engine cooling system according to a second embodiment.

The refrigerant control valve apparatus V includes, as illustrated in FIG. 12, a discharge port US (an example of a discharge portion) returning the coolant water (the example of the refrigerant) from the engine E serving as the internal combustion engine mounted at the vehicle to the engine E, a first inlet port U1 (an example of an inlet port) to which the coolant water of the radiator R is supplied via the radiator hose 1 and a second inlet port U2 (an example of the inlet port) to which the coolant water of the heater core H is supplied via the heater hose 2. The engine E includes the cylinder head portion Ea and the cylinder block portion Eb. The coolant water is supplied to an outlet valve 5 from the cylinder head portion Ea. The outlet valve 5 is constructed so that the coolant water is branched to the radiator R and the heater core H. The coolant water from the discharge port US is sent to the water pump 4 (W/P) and returned to the cylinder block portion Eb of the engine E from the water pump 4.

In the second embodiment, the coolant water at each of the radiator R and the heater core H is returned to the engine E from the refrigerant control valve apparatus V. In a construction where the coolant water is supplied for heat exchange of engine oil or fluid for an automatic transmission, for example, at the outlet valve 5, a third inlet port may be provided at the refrigerant control valve apparatus V for receiving the coolant water from equipment which performs heat exchange of the engine oil or the fluid for the automatic transmission, for example.

Figure 13:
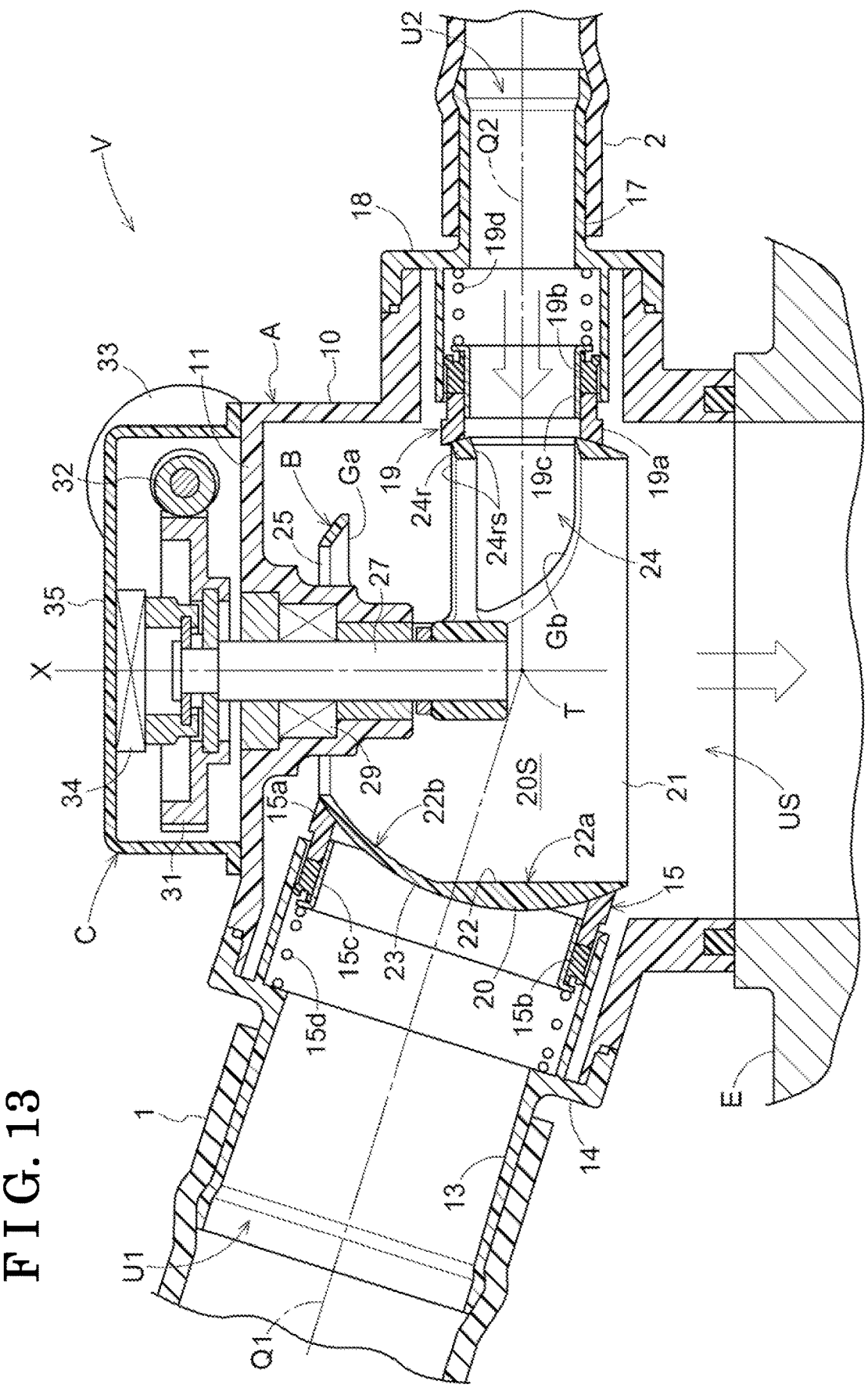
FIG. 13 is a longitudinal cross-sectional view of the refrigerant control valve apparatus in which the coolant water is sent to a second inlet port.
Figure 14:
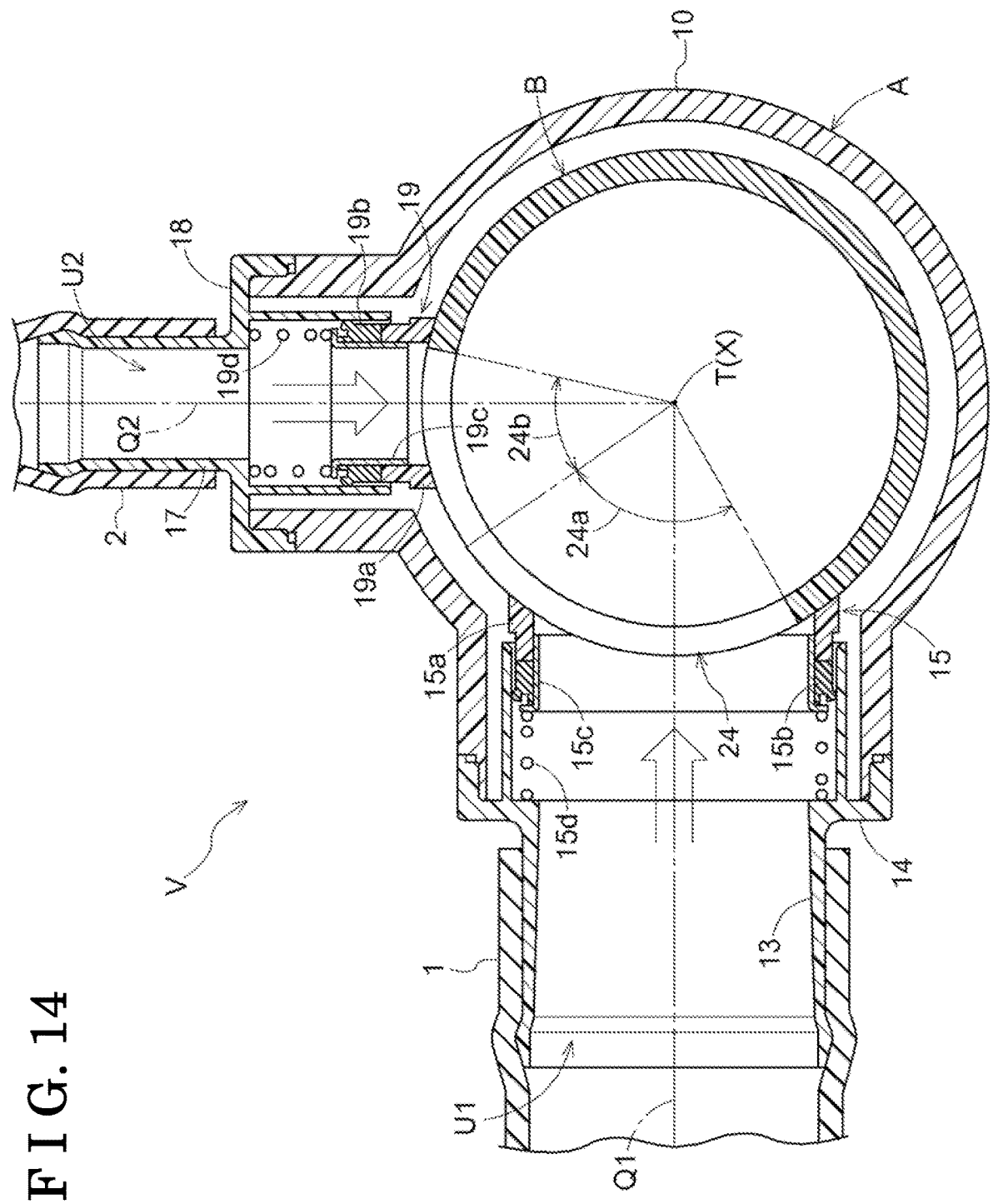
FIG. 14 is a lateral cross-sectional view of the refrigerant control valve apparatus.

As illustrated in FIGS. 13 and 14, the refrigerant control valve apparatus V includes the housing A made of resin, the rotor B made of resin, rotatable about the rotational axis X, and including the outer wall portion 23 in the spherical form, and the electric control portion C which drives and rotates the rotor B, in the same way as the first embodiment. The refrigerant control valve apparatus V is configured to establish a state receiving the coolant water from one of the radiator R and the heater core H and a state receiving the coolant water from neither the radiator R nor the heater core H. The rotational axis X is specified to be orthogonal to an opening surface of the discharge port US from a center position of the discharge port US.

[Housing]

The discharge port US is provided at the opening side of the housing body 10 of the housing A. The first inlet port U1 including the first sleeve portion 13 in a tubular form protruding outwardly and the second inlet port U2 including the second sleeve portion 17 protruding outwardly are also provided at the housing A. The inner diameter of the first sleeve portion 13 is specified to be greater than the inner diameter of the second sleeve portion 17.

The first seal portion 15 includes the annular first seal 15a, the first packing 15b, the first intermediate ring 15c and the first spring 15d. The first seal 15a, the first packing 15b, the first intermediate ring 15c and the first spring 15d are provided so as to be internally fitted at the inner end position of the first sleeve portion 13.

The first seal 15a is movable along the first center line Q1 of the first sleeve portion 13 in a state being internally fitted to the first sleeve portion 13. The first packing 15b, which is annularly formed of flexible resin, is provided with a rip portion at an outer circumferential side, the rip portion making contact with an inner peripheral surface of the first sleeve portion 13. The first packing 15b is movable along the first center line Q1 of the first sleeve portion 13.

Specifically, the first center line Q1 serving as a center of the first sleeve portion 13 is inclined relative to the rotational axis X. The first center line Q1 intersects with the rotational axis X. The position where the first center line Q1 intersects with the rotational axis X serves as the wall center T which matches a center of the outer wall portion 23 in the spherical form of the rotor B. The inclined direction of the first center line Q1 is specified so that the outer end side of the first sleeve portion 13 is away from the rotational axis X and away from the discharge port US towards an upstream (an end portion at the inlet side) of flow of coolant water at the first sleeve portion 13.

The second seal 19a, the second packing 19b, the second intermediate ring 19c, and the second spring 19d constituting the second seal portion 19 are made of the same materials as the corresponding members at the first seal portion 15 and function in the same manner as the first seal portion 15. The second seal 19a, the second packing 19b, the second intermediate ring 19c and the second spring 19d are provided in a state being internally fitted to the inner end position of the second sleeve portion 17.

[Rotor]

The rotor B includes the rotor body 20 which integrally rotates with the shaft 27 arranged coaxially with the rotational axis X.

The rotor body 20 includes the opening portion 21 (an example of a bore-shaped portion), the rotor inner wall portion 22, the outer wall portion 23 and the control bore portion 24. The opening portion 21 sends out the coolant water from the discharge port US by opening in the direction along the rotational axis X. The rotor inner wall portion 22 continues to the opening portion 21 to define the inner void 20S at the inner portion of the rotor body 20. The outer wall portion 23 includes the spherical form with reference to the wall center T. The control bore portion 24 is provided at the outer wall portion 23 so as to receive the coolant water from the first inlet port U1 or the second inlet port U2 at the inner void 20S of the rotor B.

As illustrated in FIGS. 15 to 18, the control bore portion 24 (as the example of the receiving portion) is configured by a series of the first bore portion 24a serving as a first receiving portion which includes a slightly narrower width than the inner diameter of the first seal 15a of the first inlet port U1 and the second bore portion 24b serving as a second receiving portion which includes a slightly narrower width than the inner diameter of the second seal 19a of the second inlet port U2, the first bore portion 24a and the second bore portion 24b extending along the outer periphery of the rotor body 20. The groove 24T which extends to a side where the groove 24T starts overlapping the first inlet port U1 with the rotation of the rotor B is provided at the outer circumference of the first bore portion 24a of the control bore portion 24. The groove 24T is provided by cutting a part of the outer circumferential edge of the main elongated bore portion Ga constituting the first bore portion 24a. The groove 24T may be provided at the outer circumference of the auxiliary elongated bore portion Gb constituting the first bore portion 24a.

In a case where the rotor B is rotated about the rotational axis X, the reference locus Ka (see FIG. 9, at a lower side in FIG. 15) at the outer circumference of the second bore portion 24b at one side in the direction along the rotational axis X overlaps the outer circumference of the first bore portion 24a. In addition, a positional relationship is specified so that the intermediate locus Kb at the outer circumference of the second bore portion 24b at the other side in the direction along the rotational axis X (at an upper side in FIG. 15) reaches a center portion of the first bore portion 24a in the direction along the rotational axis X.

The first width W1 of the first bore portion 24a (i.e., the width in the direction along the rotational axis X) is approximately twice as large as the second width W2 of the second bore portion 24b (i.e., the width in the direction along the rotational axis X). In addition, the rib portion 24r is provided along the aforementioned intermediate locus Kb at the first bore portion 24a so as to evenly divide the first bore portion 24a into two in the width direction thereof.

[Control of Coolant Water]

The electric control portion C includes the same construction as the first embodiment. The electric control portion C realizes control to specify the rotation position of the rotor B to the fully open position at which the first inlet port U1 and the second inlet port U2 are simultaneously opened, the second open position at which the second inlet port U2 is only opened, the first open position at which the first inlet port U1 is only opened, and the fully closed position at which the first inlet port U1 and the second inlet port U2 are simultaneously closed.

Figure 15:
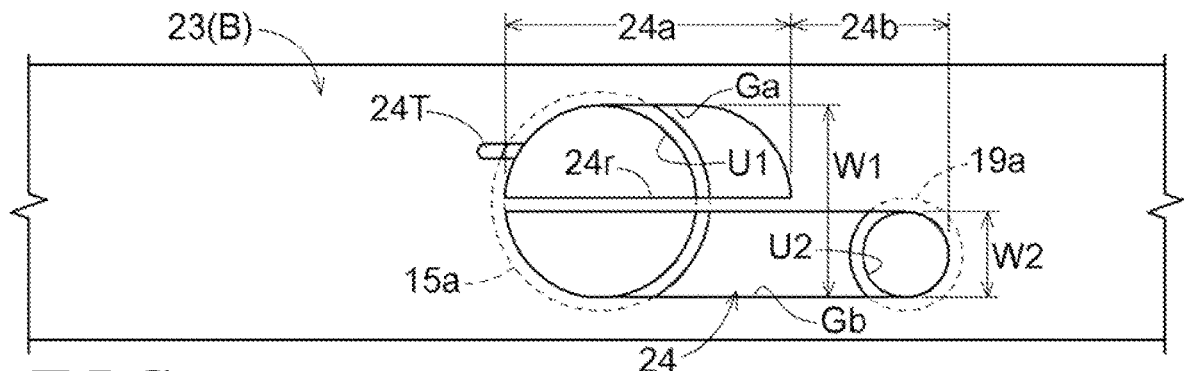
FIG. 15 is a development view of the rotor in the fully open position.

That is, in a case where the rotation position of the rotor B is specified at the fully open position, as illustrated in FIG. 15, the first seal 15a makes contact with a pair of edge portions of the first bore portion 24a while the second seal 19a makes contact with a pair of edge portions of the second bore portion 24b. Thus, both the positions of the first seal 15a and the second seal 19a are stabilized.

Figure 16:
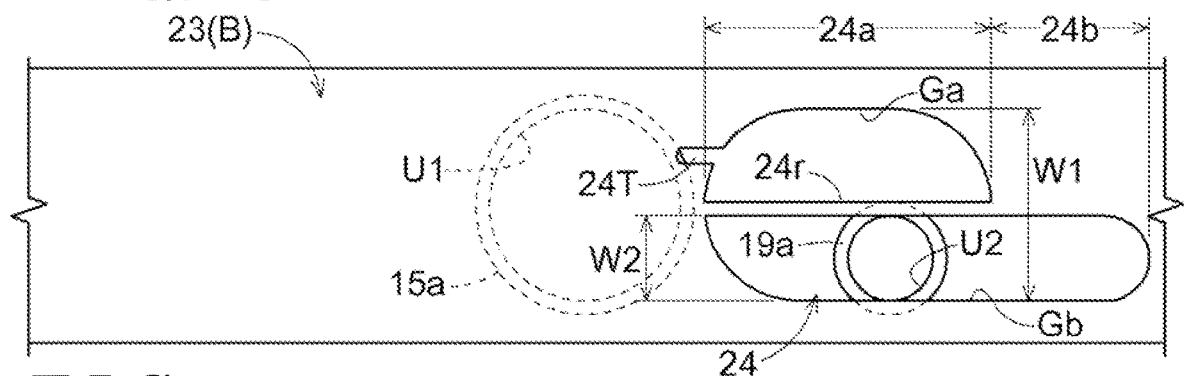
FIG. 16 is a development view of the rotor in the second open position.
Figure 17:
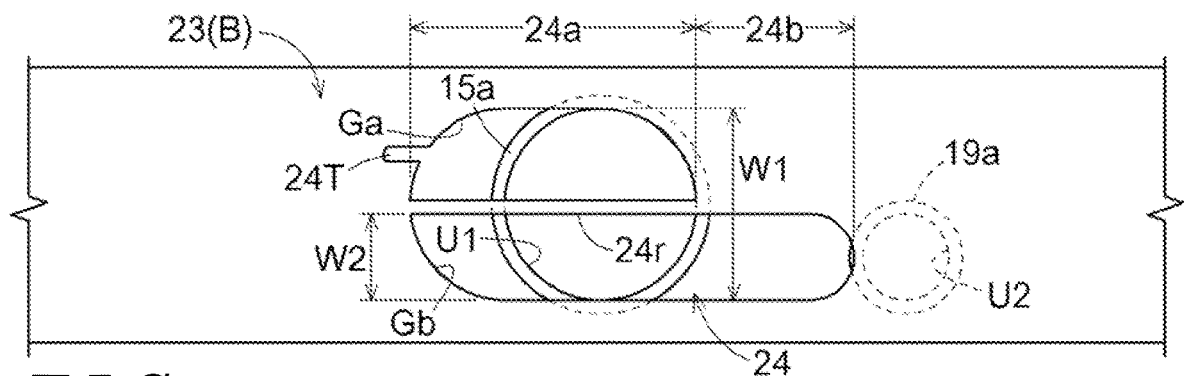
FIG. 17 is a development view of the rotor in the first open position.

In addition, in a case where the rotor B is operated to rotate in one direction based on from the fully open position so as to be specified at the second open position, as illustrated in FIG. 16, the position of the second seal 19a is stabilized because the second seal 19a reaches the position of the first bore portion 24a by moving along the auxiliary elongated bore portion Gb, and one side of the outer circumference of the second seal 19a makes contact with the edge portion of the first bore portion 24a while the other side of the outer circumference of the second seal 19a makes contact with the rib portion 24r.

Specifically, in a case where the rotor B rotates from the second open position illustrated in FIG. 16 to the fully open position illustrated in FIG. 15, the groove 24T overlaps the first inlet port U1 in conjunction with the aforementioned rotation of the rotor B. Thus, a small amount of coolant water may be supplied to the first inlet port U1 via the groove 24T at an early stage of the rotation. As a result, before the first bore portion 24a reaches a state overlapping the first inlet port U1, the temperature of the engine E is slightly changed, so that variations in temperature in a case where the coolant water is supplied via the first inlet port U1 are reduced to restrain a rapid change in temperature of the engine E.

In a case where the rotor B is operated to rotate in the other direction based on from the fully open position so as to be specified at the first open position, as illustrated in FIG.

17, the position of the first seal 15a is stabilized in a state where the first seal 15a makes contact with the pair of edge portions of the first bore portion 24a (i.e., the edge portion of the main elongated bore portion Ga and the edge portion of the auxiliary elongated bore portion Gb) because the first seal 15a is positioned at the first bore portion 24a.

Figure 18:
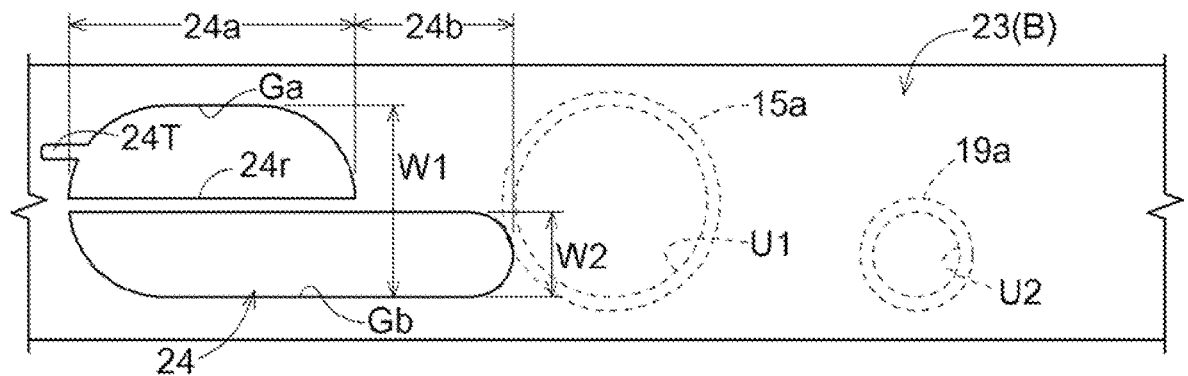
FIG. 18 is a development view of the rotor in the fully closed position.

Further, in a state where the rotor B is specified at the fully closed position, the first seal 15a makes close contact with the outer wall portion 23 of the rotor B and the second seal 19a makes close contact with the outer wall portion 23 of the rotor B as illustrated in FIG. 18.

Third Embodiment

The refrigerant control valve apparatus V according to a third embodiment includes the common construction to the aforementioned first embodiment except for the construction of the rotor B. In the third embodiment, the configurations common to the first embodiment bear the common reference numerals thereto.

Third Embodiment: Basic Construction

Figure 19:
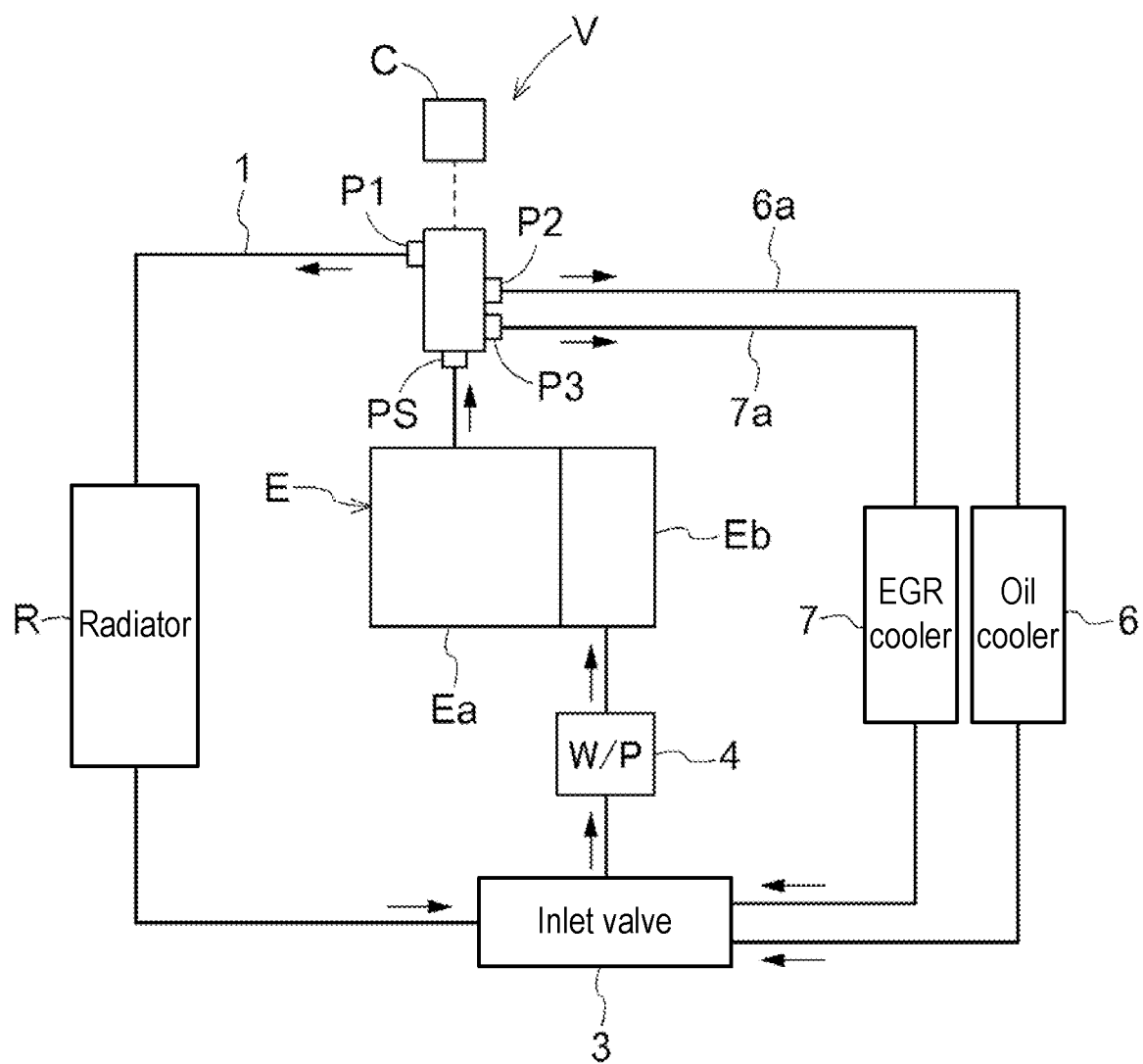
FIG. 19 is a diagram illustrating the engine cooling system according to a third embodiment.

The refrigerant control valve apparatus V includes, as illustrated in FIG. 19, the inlet port PS receiving the coolant water (the example of the refrigerant) from the engine E and the first discharge port P1 sending the coolant water to the radiator R via the radiator hose 1. The refrigerant control valve apparatus V also includes the second discharge port P2 which supplies the coolant water to an oil cooler 6 via an oil cooler hose 6a and a third discharge port P3 which supplies the coolant water to an EGR cooler 7 via an EGR hose 7a. In the third embodiment, each of the oil cooler 6 and the EGR cooler 7 is provided as a device where the coolant water is supplied. The device, however, is not limited to the oil cooler 6 or the EGR cooler 7 and may be a heater core, for example.

The engine E includes the cylinder head portion Ea and the cylinder block portion Eb. The coolant water is supplied from the cylinder head portion Ea to the inlet port PS of the refrigerant control valve apparatus V. The coolant water supplied to the radiator R and the coolant water supplied to each of the oil cooler 6 and the EGR cooler 7 are sent to the water pump 4 (W/P) from the inlet valve 3 and are returned to the cylinder block portion Eb of the engine E from the water pump 4.

Figure 20:
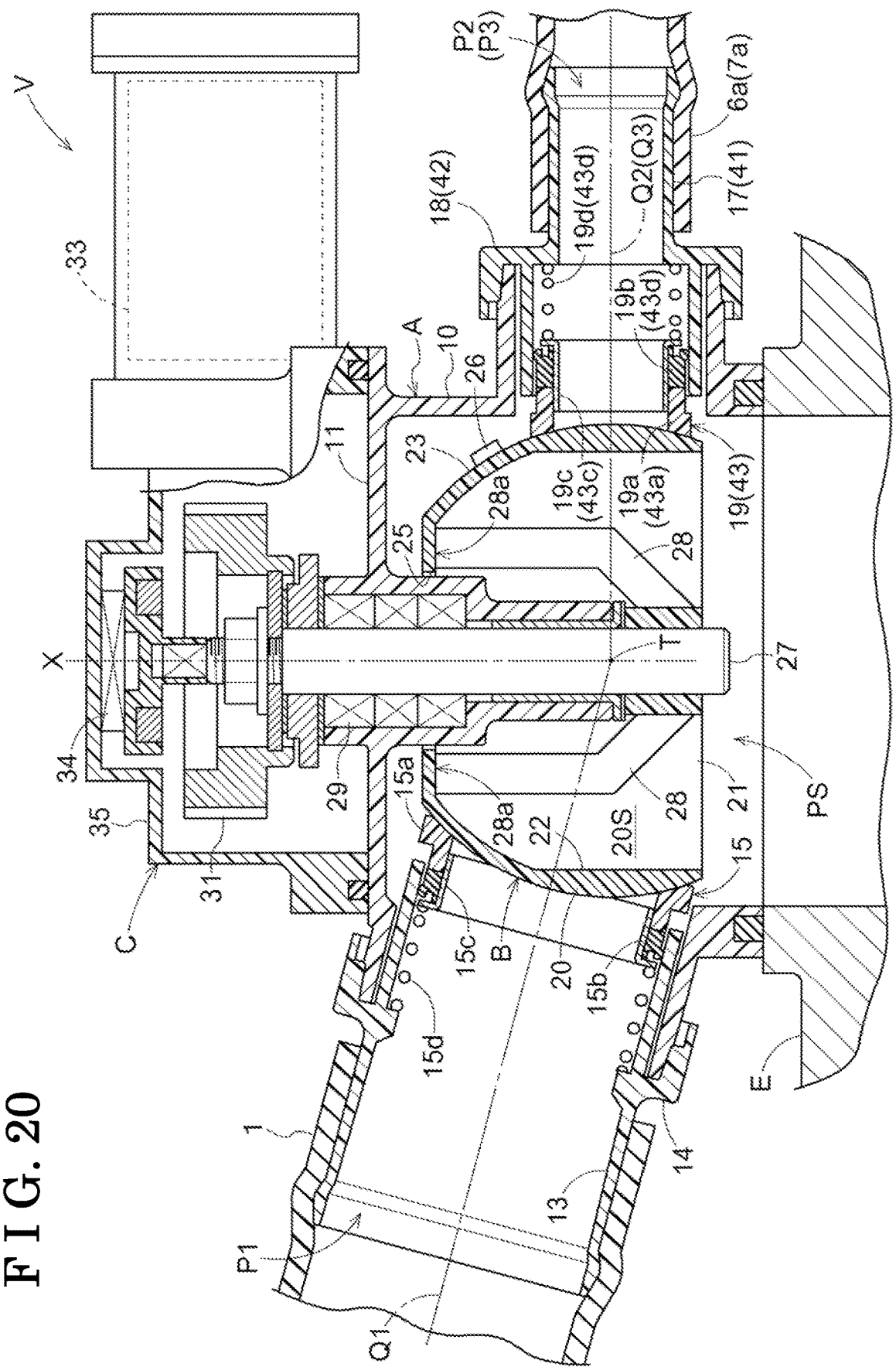
FIG. 20 is a longitudinal cross-sectional view of the refrigerant control valve apparatus in which the rotor is in the fully closed position.
Figure 21:
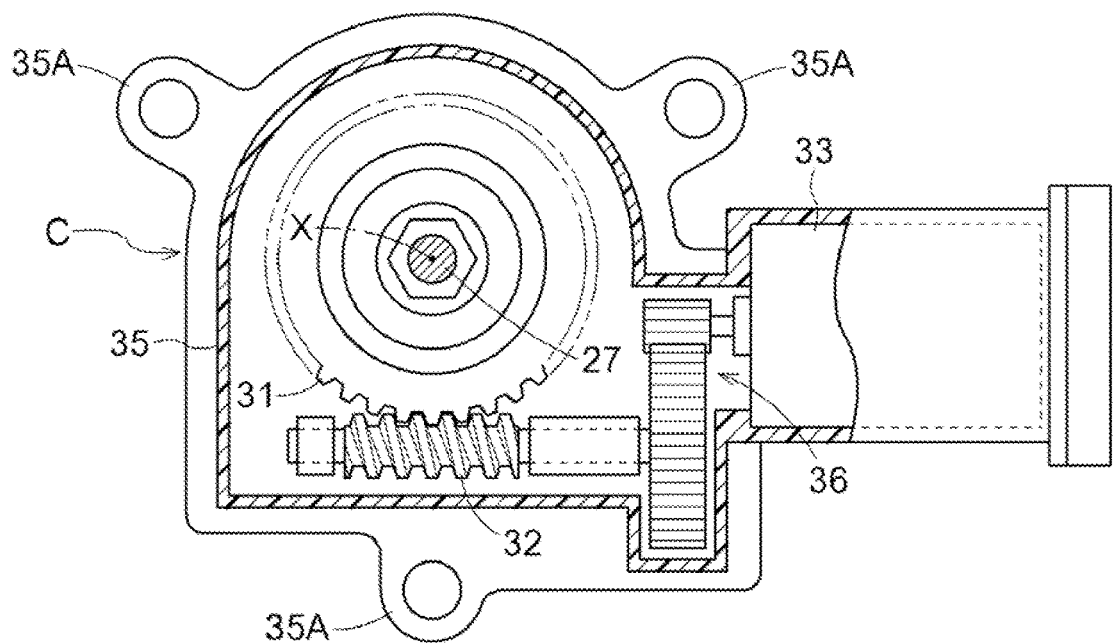
FIG. 21 is a lateral cross-sectional view of an electric control portion.
Figure 22:
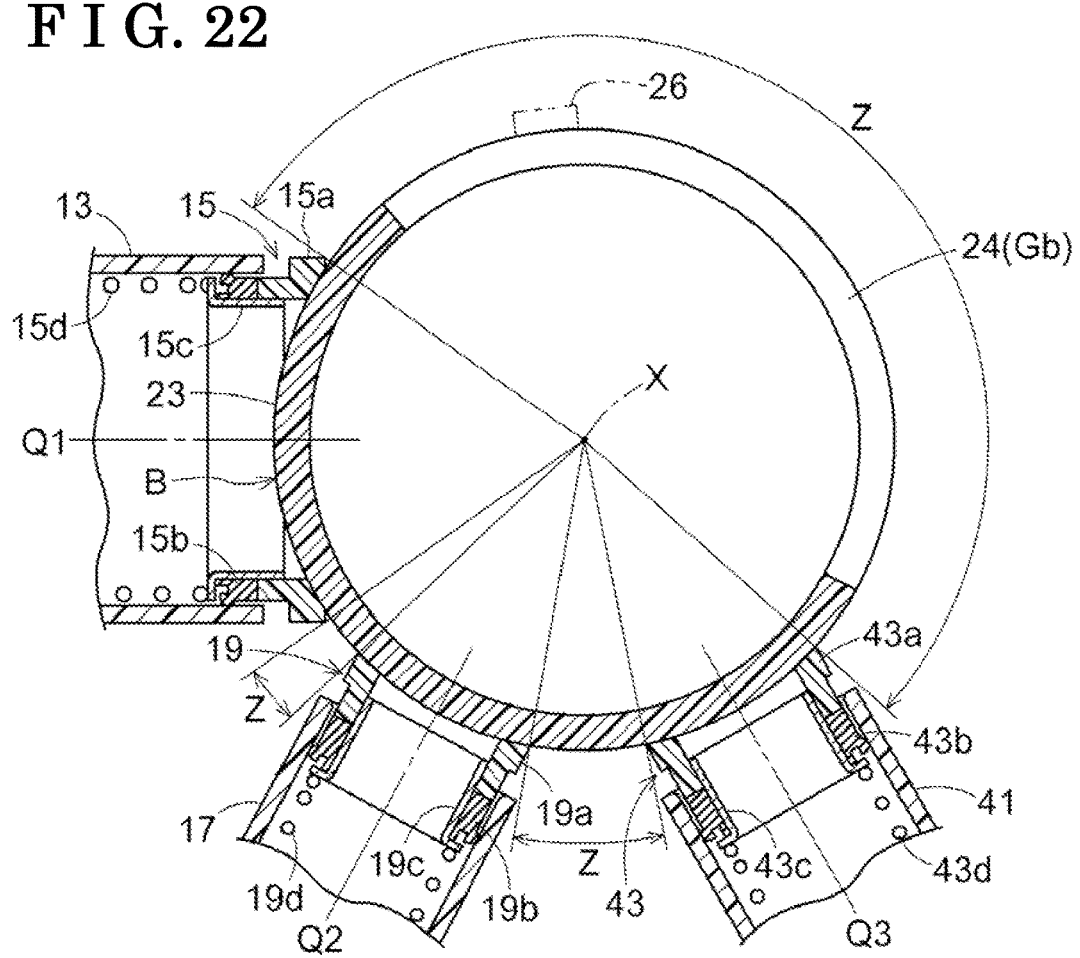
FIG. 22 is a lateral cross-sectional view illustrating a positional relationship between the rotor and ports.

As illustrated in FIGS. 20 to 22, the refrigerant control valve apparatus V includes the housing A made of resin, the rotor B made of resin, and the electric control portion C. The rotor B is housed at the inner portion of the housing A so as to be rotatable about the rotational axis X and includes the outer wall portion 23 in a spherical form. The electric control portion C drives and rotates the rotor B.

[Housing]

The housing A includes the housing plate 11 in a cover form so as to close one end portion of the housing body 10 in a tubular form. The inlet port PS is provided at the opening side of the housing body 10. The housing body 10 is provided with the first discharge port P1, the second discharge port P2 and the third discharge port P3. Inner diameters of the second discharge port P2 and the third discharge port P3 are specified to be equal to each other.

The first seal portion 15 is provided at an inner end of the first discharge port P1. The second seal portion 19 is provided at an inner end of the second discharge port P2. A third seal portion 43 is provided at an inner end of the third discharge port P3. The aforementioned seal portions include common configurations to one another and therefore the configuration of the first discharge port P1 is only explained. The first discharge port P1 includes the first sleeve portion 13 (the example of the first member) in a cylindrical form connected to the radiator hose 1, the first flange portion 14 provided at the outer periphery of the first sleeve portion 13 so as to form a flange, and the first seal portion 15 internally fitted to the inner end position of the first sleeve portion 13.

The first seal portion 15 is constructed by the first seal 15a internally fitted to the first sleeve portion 13, the first packing 15b, the first intermediate ring 15c and the first spring 15d. In the aforementioned construction, the first spring 15d is arranged between the first intermediate ring 15c and plural projection pieces provided projecting at an inner surface of the first sleeve portion 13.

Each of the first seal 15a, the first packing 15b and the first intermediate ring 15c is annularly formed and is movably supported along the first center line Q1 of the first sleeve portion 13. Because of the aforementioned construction, the first seal 15a maintains a state contacting the outer wall portion 23 of the rotor B by the biasing force of the first spring 15d.

FIG. 22 illustrates arrangements and constructions of the first discharge port P1, the second discharge port P2 and the third discharge port P3. In FIG. 22, center lines of the respective discharge ports are illustrated as the first center line Q1, the second center line Q2 and a third center line Q3. The second discharge port P2 includes the second sleeve portion 17, the second flange portion 18 and the second seal portion 19. The third discharge port P3 includes a third sleeve portion 41, a third flange portion 42 and the third seal portion 43.

The second seal portion 19 includes the second seal 19a, the second packing 19b, the second intermediate ring 19c and the second spring 19d. The third seal portion 43 includes a third seal 43a, a third packing 43b, a third intermediate ring 43c and a third spring 43d.

Projection pieces are provided at an inner surface of the second sleeve portion 17 and at an inner surface of the third sleeve portion 41 in the same way as the inner surface of the first sleeve portion 13 so as to receive the springs.

[Rotor]

The rotor B includes the rotor body 20 which integrally rotates with the shaft 27 arranged coaxially with the rotational axis X.

The rotor body 20 includes the opening portion 21, the rotor inner wall portion 22, the outer wall portion 23 and the control bore portion 24 (the detailed example of the bore portion). The opening portion 21 serves as the receiving portion that receives the coolant water from the inlet port PS by opening in the direction along the rotational axis X. The rotor inner wall portion 22 continues to the opening portion 21 to define the inner void 20S at the inner portion of the rotor body 20. The outer wall portion 23 includes the spherical form with reference to the wall center T. The control bore portion 24 is provided at the outer wall portion 23 so as to send out the coolant water from the inner void 20S of the rotor B to the first discharge port P1, the second discharge port P2 or the third discharge port P3.

A positional relationship of the control bore portion 24 relative to the first discharge port P1, the second discharge port P2 and the third discharge port P3 may be illustrated in FIGS. 23 to 26.

Figure 23:
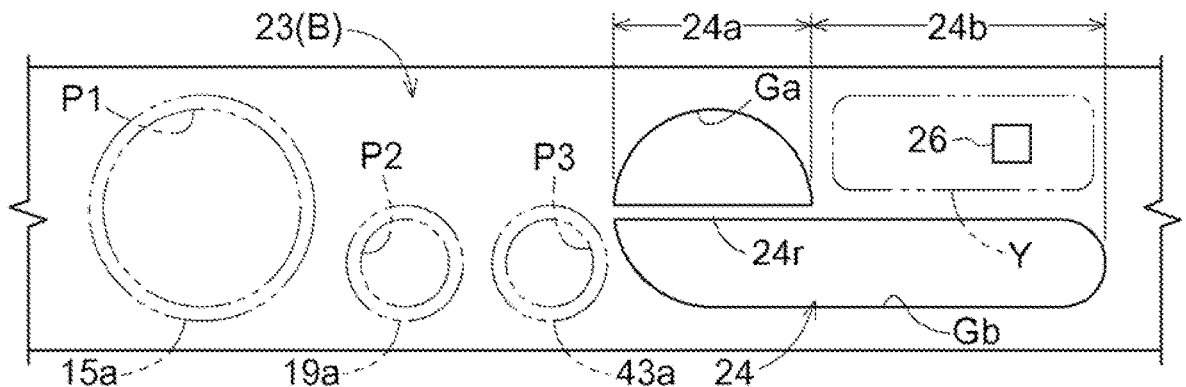
FIG. 23 is a development view of the rotor in the fully closed position.
Figure 24:
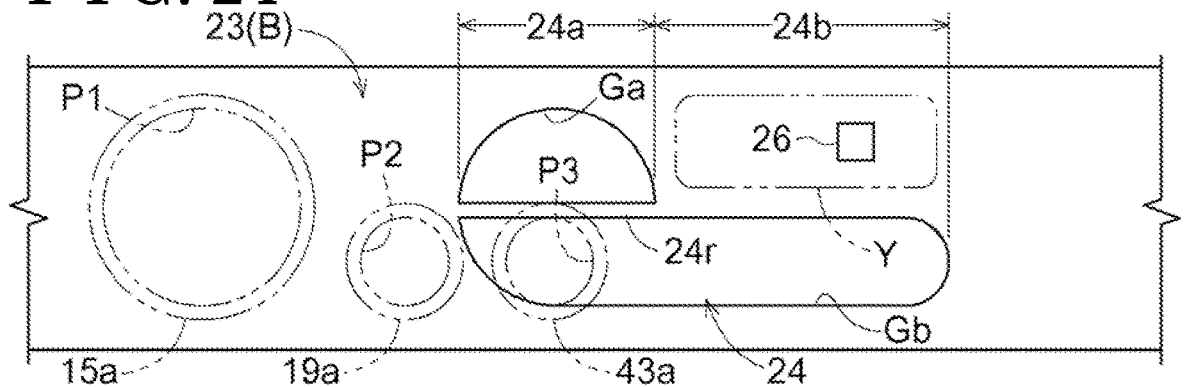
FIG. 24 is a development view of the rotor in a state where a third port is in communication with the rotor.
Figure 25:
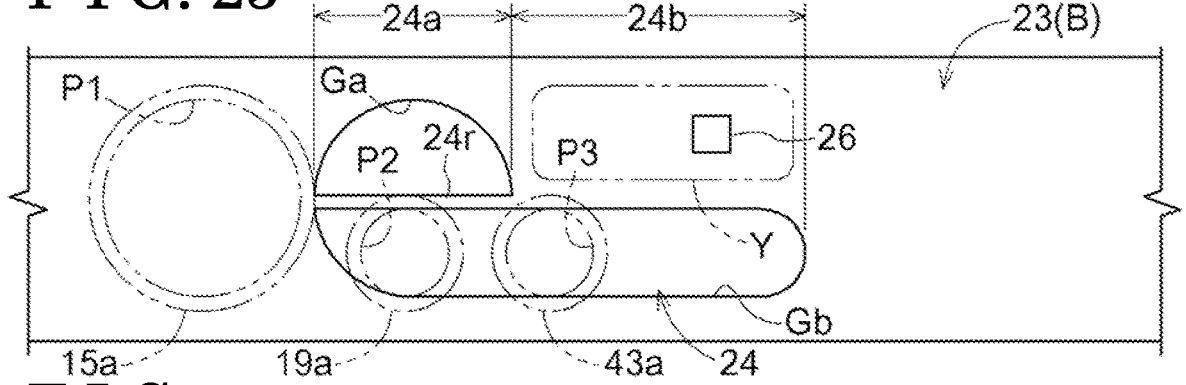
FIG. 25 is a development view of the rotor in a state where the third port and a second port are in communication with the rotor.

In FIG. 23, as the control bore portion 24, the first bore portion 24a including a slightly narrower width than the inner diameter of the first seal 15a of the first discharge port P1 is provided at the rotor body 20. In addition, the second bore portion 24*b* including a slightly narrower width than the inner diameter of the second seal 19*a* of the second discharge port P2 and than an inner diameter of the third seal 43*a* of the third discharge port P3 is provided at the rotor body 20. A series of the first bore portion 24*a* and the second bore portion 24*b* is provided extending along the outer periphery of the rotor body 20. Further, the rib portion 24*r* which equally divides the first bore portion 24*a* into two in the width direction thereof is provided at the rotor body 20.

Figure 26:
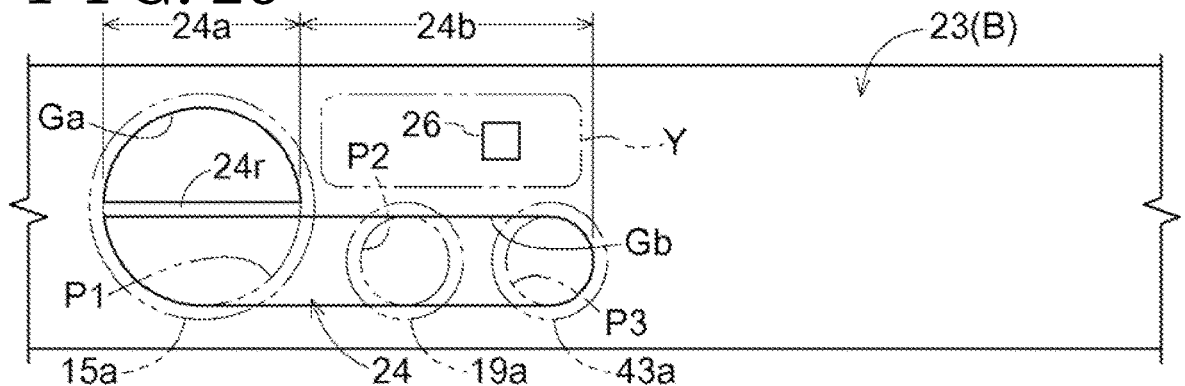
FIG. 26 is a development view of the rotor in the fully open position.

Based on the aforementioned construction, the rotor B is operated to rotate from the fully closed position illustrated in FIG. 23 to the fully open position illustrated in FIG. 26 so that the third discharge port P3, the second discharge port P2 and the first discharge port P1 are connected, in the mentioned order, to the inner portion of the rotor body 20.

Figure 27:
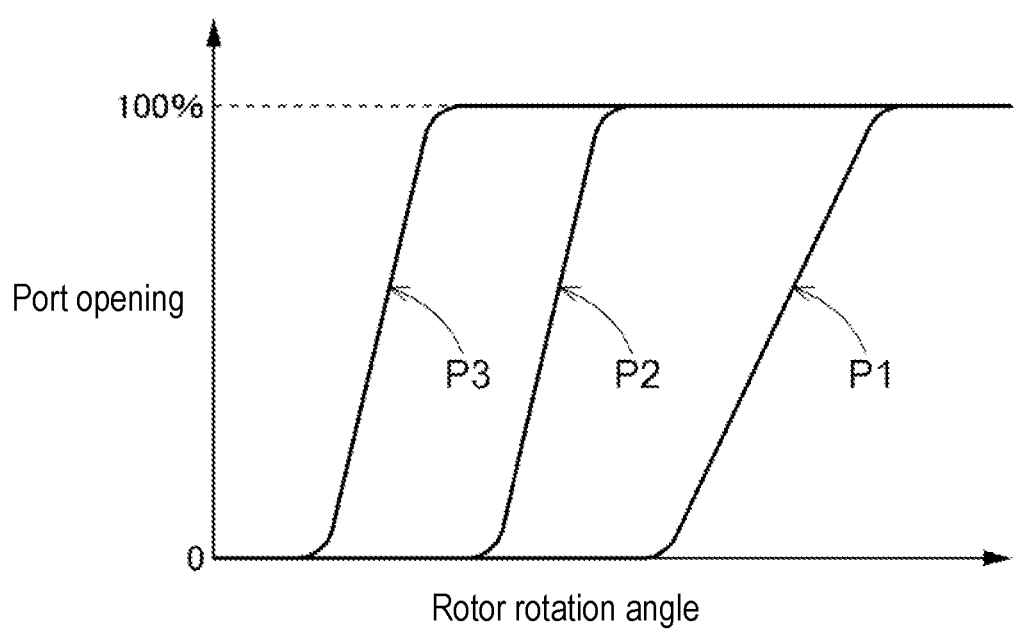
FIG. 27 is a chart illustrating a relationship between a rotation angle of the rotor and an opening degree of each port.

According to the refrigerant control valve apparatus V, as illustrated in FIG. 27, the fully closed position where all the first discharge port P1, the second discharge port P2 and the third discharge port P3 are closed may be established by the rotor B specified at a predetermined closed position. In addition, it is constructed that, by the rotation operation of the rotor B in the open direction from the aforementioned fully closed position, the opening of the third discharge port P3 first increases, then the opening of the second discharge port P2 increases after the opening of the third discharge port P3 reaches 100%, and the opening of the first discharge port P1 increases after the opening of the second discharge port P2 reaches 100% so that the opening of the first discharge port P1 is specified to be 100%.

Based on the aforementioned construction, the refrigerant control valve apparatus V is maintained in the fully closed state in a case where warm-up is required such as immediately after the start of the engine E. In a case where the temperature of the coolant water increases to a temperature at which heat exchange at the EGR cooler 7 is available while the aforementioned fully closed state is maintained, the opening of the third discharge port P3 increases to start supply of the coolant water to the EGR cooler 7. Thereafter, the temperature of the coolant water further increases to thereby increase the opening of the second discharge port P2. The coolant water is supplied to the oil cooler 6 for heat exchange accordingly.

In a case where the water temperature increases so that heat radiation is required, the opening of the first discharge port P1 increases to achieve heat radiation at the radiator R. That is, the rotation of the rotor B in a certain direction increases the opening of each of the third discharge port P3, the second discharge port P2 and the first discharge port P1 in the mentioned order so as to supply the coolant water.

In the rotor body 20, the opening portion 25 arranged at the opposite side from the opening portion 21 is provided in a state where the shaft 27 penetrates through the opening portion 25. The plural connecting bodies 28 provided at a projection end of the shaft 27 are connected to the rotor inner wall portion 22 of the rotor body 20 so as to integrally rotate with the rotor B.

[Rotor: Connecting Body]

The rotor body 20 is a resinous molded product with a die. Thus, at a portion in the inner circumference of the rotor body 20 to which the connecting body 28 is connected, a so-called "sink" is generated upon molding. The aforementioned sink causes the outer wall portion 23 which is opposed to the connecting portion of the connecting body 28 to be dented, which may form a recess portion. The aforementioned sink is generated upon molding because heat radiation time of the connecting body 28 of which amount of resin is large is longer than heat radiation time of the outer wall portion 23 of which amount of resin is small. Specifically, the heat radiation of the connecting body 28 continues even after the heat radiation of the outer wall portion 23 is finished, which results in the recess portion generated by shrinkage in conjunction with the heat radiation at an outer peripheral side of a connecting position 28*a* to which the connecting body 28 is connected. When the recess portion is formed at the outer wall portion 23, a gap is provided between a seal (for example, the first seal 15*a*) and the outer wall portion 23 even in a case where the seal makes contact with the outer wall portion 23. Water leakage through the aforementioned gap may inhibit an appropriate flow control.

In order to eliminate the aforementioned drawback, the connecting position 28*a* of the connecting body 28 relative to the rotor body 20 is specified out of a region where the seal makes contact as illustrated in FIG. 20. The recess portion is therefore inhibited from being formed at the surface of the outer wall portion 23. The outer wall portion 23 is highly-accurately formed in the spherical form with reference to the wall center T. The sealing ability of the seal is highly maintained.

In the aforementioned construction, base end portions of the plural connecting bodies 28 are connected to an end portion of the shaft 27, the end portion being positioned at the inner portion of the opening portion 21. Intermediate portions of the plural connecting bodies 28 protrude to an opposite side from the opening portion 21 so as to be in parallel with the rotational axis X. Protruding ends of the connecting bodies 28 are connected to a wall portion in the rotor B, the wall portion being positioned out of the outer wall portion 23 in the spherical form. The aforementioned position of the wall portion serves as the connecting position 28*a*. As a result, the sealing ability of the seal is not influenced by a possible dent generated at the outer side of the connecting position 28*a* caused by molding of the rotor body 20 with a die.

In the refrigerant control valve apparatus V of this type, water pressure of the coolant water at the inner void 20S of the rotor body 20 is highest in a state where the rotor B is at the fully closed position. Thus, it is important to highly-accurately restrain leakage of the coolant water under circumstances at the fully closed position. In a state where the coolant water is supplied to any of the discharge ports, water leakage is unlikely to occur because the water pressure at the inner void 20S decreases. Thus, decrease in accuracy of sealing ability at each seal is permissible.

Because of the aforementioned reason, as illustrated in FIG. 22, the connecting position 28*a* is specified at a connection allowable region Z at the outer wall portion 23 of the rotor B, the connection allowable region Z excluding a region where the first seal 15*a*, the second seal 19*a* and the third seal 43*a* make contact with the outer wall portion 23 in a state where the rotor B is disposed at the fully closed position, and also is specified at a position where the control bore portion 24 is not provided.

[Rotor: Stopper]

A stopper 26 is provided projecting at the outer circumference of the rotor B so as to determine a rotation limit of the rotor B. The stopper 26 is provided at a non-contact region Y in the outer wall portion 23 of the rotor B as illustrated in FIGS. 23 to 26.

In a case where the rotation position of the rotor B is held at a certain position such as the fully closed position, for example, it is desirable to mechanically decide the rotation limit of the rotor B by the stopper 26 which is provided projecting at the rotor B. Nevertheless, because a thickness of the stopper 26 is greater than a thickness of the rotor body 20, it is considerable that, based on the same reason as the aforementioned "sink", the stopper 26 formed by resin molding with a die may influence a surface accuracy of the outer wall portion 23 around the stopper 26. Because of such reason, the stopper 26 is provided at the non-contact region Y where none of the seals makes contact with the outer wall portion 23. As a result, the stopper 26 is inhibited from influencing the surface accuracy of the outer wall portion 23 of the rotor B to thereby inhibit the sealing ability from decreasing.

[Electric Control Portion]

The shaft 27 is supported at the housing plate 11 so as to be rotatable thereto in a state penetrating through the housing plate 11 of the housing A. The seal 29 is provided between the shaft 27 and the boss portion of the housing plate 11 so as to inhibit leakage of the coolant water.

The electric control portion C is configured in a state where the wheel gear 31 provided at the end portion of the shaft 27, the worm gear 32 meshed with the wheel gear 31, the electric motor 33 (the example of the actuator) driving and rotating the worm gear 32, and the rotation angle sensor 34 of a non-contact type detecting the rotation position of the rotor B based on the rotation position of the worm gear 32 are housed in the control case 35.

In the third embodiment, a transmission system for transmitting a driving force of the electric motor 33 to the worm gear 32 includes a gear deceleration mechanism 36. Plural flange portions 35A are provided at the control case 35. Bolts penetrating through penetration bores provided at the respective flange portions 35A are meshed with the housing A so that the control case 35 is connected and fixed to the housing A.

The control case 35 is connected and fixed to the housing body 10 so as to have a watertight configuration. The electric motor 33 is controlled by an external control unit. The control unit specifies a target position of the rotor B based on a detection result of a water temperature sensor which measures the temperature of the coolant water of the engine E. The control unit controls the rotor B so that the rotation position thereof achieves the target position based on a detection signal of the rotation angle sensor 34.

The control case 35 is provided as a separate member from the housing body 10 and is coupled and fixed to the outer surface of the housing body 10. Thus, even in a case where the refrigerant control valve apparatus V including different specifications is manufactured, for example, the number of components is inhibited from increasing because the housing body 10 and the electric control portion C are individually manufactured.

[Control of Coolant Water]

As explained with reference to FIG. 27 in the above, the rotor B is operated to rotate in the open direction from the fully closed state by the setting of the rotation position of the rotor B. The electric control portion C realizes the control where the opening of the third discharge port P3 first increases, then the opening of the second discharge port P2 increases after the opening of the third discharge port P3 reaches 100%, and the opening of the first discharge port P1 increases after the opening of the second discharge port P2 reaches 100% so that the opening of the first discharge port P1 is specified to be 100%. The state where the opening of the first discharge port P1 is specified to be 100% corresponds to the fully open position of the rotor B.

The rotation position of the rotor B is controlled as mentioned above so that the coolant water is supplied to the EGR cooler 7, then the coolant water is supplied to the oil cooler 6, and finally the coolant water is supplied to the radiator R.

In addition, based on the specification of the configuration of the control bore portion 24 of the rotor B and the arrangements of the first discharge port P1, the second discharge port P2 and the third discharge port P3, the opening of each of the third discharge port P3, the second discharge port P2 and the first discharge port P1 may increase in the mentioned order and each opening is adjustable by the rotation operation of the rotor B in the certain direction.

Other Embodiments

The present invention may be constructed as below other than the aforementioned embodiments.

Figure 28:
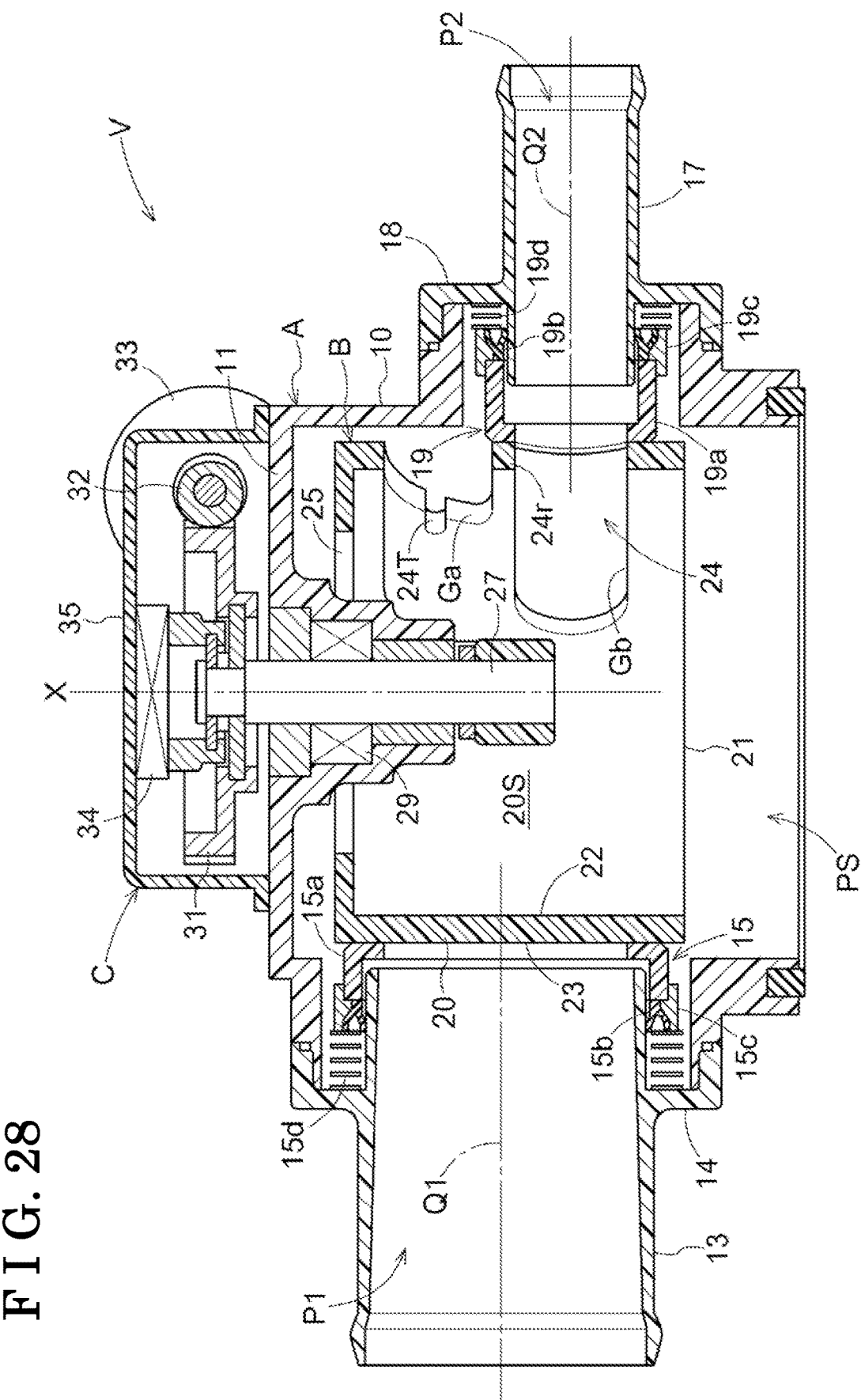
FIG. 28 is a cross-sectional view of the refrigerant control valve apparatus according to another embodiment (a)

(a) As illustrated in FIG. 28, the refrigerant control valve apparatus V is configured by the housing body 10 in a tubular form of which one end portion is closed by the housing plate 11 as the housing A, and the rotor body 20 in a cylindrical form as the rotor B. Further, the first discharge port P1 and the second discharge port P2 are provided at the housing body 10 and also the sleeve portion, the flange portion and the seal in the same way as the first embodiment are provided (configurations common to the first embodiment bear the common reference numerals thereto).

In the other embodiment (a), the control bore portion 24 is provided at the rotor body 20. The control bore portion 24 is provided so as to correspond to the first seal 15a and the second seal 19a which make contact with the cylindrical outer wall portion 23 of the rotor body 20. The rib portion 24r is provided at a position dividing the first bore portion 24a. Accordingly, the main elongated bore portion Ga and the auxiliary elongated bore portion Gb are provided at the control bore portion 24.

In the refrigerant control valve apparatus V formed in the cylindrical form, a part of the second seal 19a makes contact with the edge portion of the control bore portion 24 to appropriately maintain the position of the second seal 19a and to restrain dislocation of the second seal 19a.

According to the aforementioned construction, in the same way as the second embodiment, the flow direction of the coolant water may be specified in a reverse direction as in the second embodiment.

(b) The first seal portion 15, the second seal portion 19 and the third seal portion 43 are not limited to the aforementioned constructions. At least one of the first seal portion 15, the second seal portion 19 and the third seal portion 43 may be constructed without a spring and with a rip serving as a seal making contact with the outer wall portion 23 of the rotor B, for example.

Figure 29:
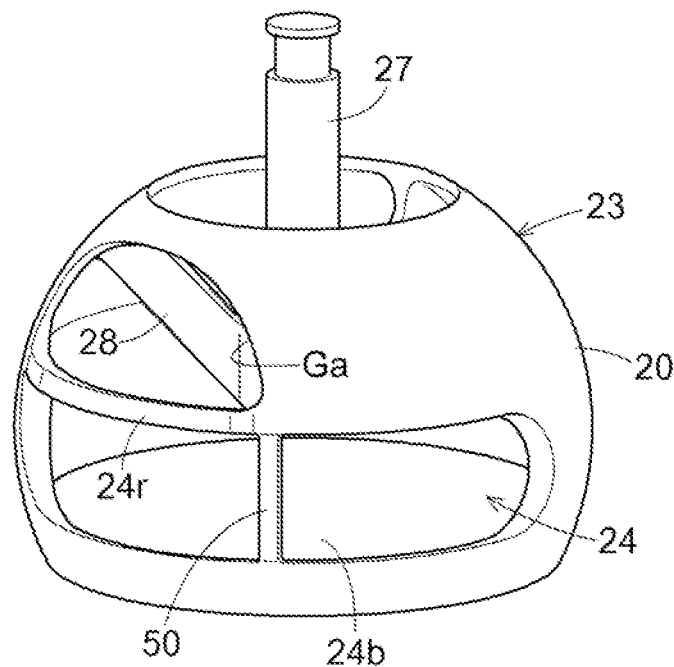
FIG. 29 is a perspective view of the rotor according to still another embodiment (c)
Figure 30:
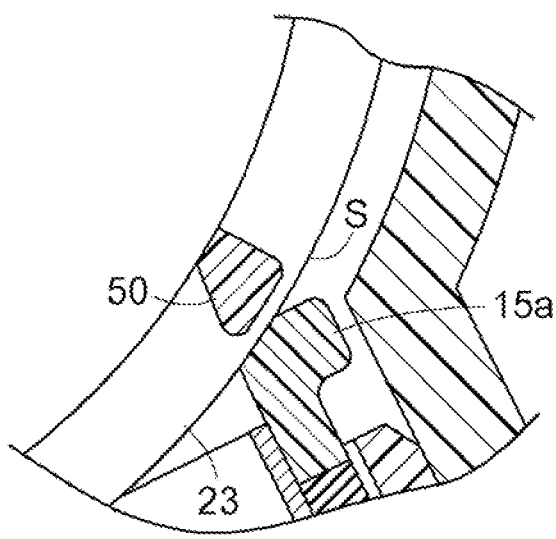
FIG. 30 is an enlarged view in the vicinity of a longitudinal rib portion of still another embodiment (c)

(c) As illustrated in FIG. 29, a longitudinal rib portion 50 protruding in the extending direction of the shaft 27 which serves as a rotational shaft may be provided at the second bore portion 24b. According to such construction, the configuration of the second bore portion 24b may be maintained by the longitudinal rib portion 50. Therefore, a desired flow of refrigerant may be inhibited from varying In addition, as illustrated in an enlarged view of a vicinity of the longitudinal rib portion 50 in FIG. 30, the longitudinal rib portion 50 may be constructed so as to be retracted towards a center of the rotational shaft relative to the imaginary outer wall surface S obtained by the extension of the outer wall portion 23 of the rotor body 20 so as to restrain the contact pressure relative to the first seal 15a. Because of the longitudinal rib portion 50 constructed as above, a gap may be formed between the longitudinal rib portion 50 and the first seal 15a upon rotation of the rotor body 20. Accordingly, the contact pressure of the longitudinal rib portion 50 relative to the first seal 15a is reduced to restrain abrasion of the first seal 15a and to increase the lifetime of the first seal 15a. As a result, desired sealing ability may be maintained, which inhibits increase of leakage of the coolant water. Further, because the longitudinal rib portion 50 is inhibited from sliding relative to the first seal 15a, sliding torque may be reduced.

The second receiving portion 24b may be also constructed to include the longitudinal rib portion 50 protruding in the extending direction of the shaft 27 serving as the rotational shaft, which is not illustrated. The second receiving portion 24b may be constructed to be retracted towards the center of the rotational shaft relative to the imaginary outer wall surface S obtained by the extension of the outer wall portion 23 of the rotor body 20. Because of such construction, the same effect as the case where the longitudinal rib portion 50 is provided at the second bore portion 24b may be exercised.

(d) The refrigerant control valve apparatus V illustrated in FIG. 2 includes the first discharge port P1 and the second discharge port P2. Alternatively, the refrigerant control valve apparatus V may be constructed to include only the first discharge port P1 as illustrated in FIG. 31. The refrigerant control valve apparatus V illustrated in FIG. 13 may be also constructed to include only the first inlet port U1 which is not illustrated.

INDUSTRIAL APPLICABILITY

The present invention is applicable to a refrigerant control valve apparatus where a rotor is rotatably housed at an inner portion of a housing which includes a discharge port.

EXPLANATION OF REFERENCE NUMERALS 13 first member (first sleeve portion)
15a first seal
17 second member (second sleeve portion)
19a second seal
20S inner void
21 receiving portion, bore-shaped portion (opening portion)
23 outer wall portion
24 bore portion, receiving portion
24a first bore portion, first receiving portion
24b second bore portion, second receiving portion
24r rib portion
24ra center region
24rb inclined region
26 stopper
33 actuator (electric motor)
35 control case
A housing
B rotor
E internal combustion engine (engine)
Ka reference locus
Kb intermediate locus
PS inlet port
P1 discharge port, first discharge port
P2 discharge port, second discharge port
S imaginary outer wall surface
US discharge port
U1 inlet port, first inlet port
U2 inlet port, second inlet port
T wall center
X rotational axis

The invention claimed is:

1. A refrigerant control valve apparatus comprising:
   a housing including an inlet port which receives a refrigerant from an internal combustion engine and at least two discharge ports which are constituted by a first discharge port including a large diameter and a second discharge port including a small diameter, the first discharge port and the second discharge port distributing and sending out the refrigerant;
   a rotor forming a rotational body and controlling a flow of the refrigerant by rotating about a rotational axis at an inner portion of the housing;
   a first seal provided at the first discharge port and making contact with an outer surface of the rotor, the first seal including an annular form; and
   a second seal provided at the second discharge port and making contact with an outer surface of the rotor, the second seal including an annular form,
   the rotor including:
   a receiving portion receiving the refrigerant from the inlet port;
   an inner void accommodating the refrigerant which is received; and
   a bore portion including a first bore portion and a second bore portion for sending out the refrigerant to the first discharge port or the second discharge port, the first bore portion being formed in a wide width, the second bore portion being formed in a narrow width,
   at least a part of the second seal is configured to make contact with an edge portion of the first bore portion in a case where at least a part of the first bore portion is in communication with the second discharge port by a rotation of the rotor,
   the first discharge port includes a center line passing through a center of a sphere forming the rotor, and
   the first discharge port includes a discharge-side end portion inclined in a direction away from the inlet port.

2. The refrigerant control valve apparatus according to claim 1, further comprising a control case mounted at an external portion of the housing, the control case specifying a rotation position of the rotor by a driving force of an actuator.

3. The refrigerant control valve apparatus according to claim 1, wherein in a case where the rotor is rotated about the rotational axis, a positional relation is specified so that a reference locus at an outer circumference of the second bore portion at one side in a direction along the rotational axis overlaps an outer circumference of the first bore portion, and an intermediate locus at the outer circumference of the second bore portion at the other side in the direction along the rotational axis reaches a center portion of the first bore portion,
   the first bore portion is provided with a rib portion which divides the first bore portion at the intermediate locus.

4. The refrigerant control valve apparatus according to claim 3, wherein the rib portion is provided being displaced in a direction of the rotational axis relative to an imaginary outer wall surface which is obtained by an extension of an outer wall portion of the rotor for restraining a contact pressure with the first seal.

5. The refrigerant control valve apparatus according to claim 4, wherein the rib portion includes a center region which is displaced in the direction of the rotational axis relative to the imaginary outer wall surface at a center of the rotor in a circumferential direction thereof and an inclined region where an outer end portion of the rib portion is gently inclined to be connected to the center region and the outer wall portion of the rotor.

6. The refrigerant control valve apparatus according to claim 1, wherein the rotor includes an outer wall portion in a spherical form with reference to a wall center on the rotational axis.

7. The refrigerant control valve apparatus according to claim 1, wherein the bore portion includes a groove which extends to a side where the bore portion starts overlapping the discharge port with the rotation of the rotor.

8. The refrigerant control valve apparatus according to claim 1, further comprising a stopper provided projecting at a region in an outer circumference of the rotor, the region at which the stopper is inhibited from making contact with the first seal and the second seal, the stopper determining a rotation limit of the rotor.

9. The refrigerant control valve apparatus according to claim 1, wherein the second bore portion includes a longitudinal rib portion extending in an extending direction of a rotational shaft, the longitudinal rib portion being retracted towards a center of the rotational shaft relative to an imaginary outer wall surface obtained by an extension of an outer wall portion of the rotor for restraining a contact pressure with the first seal.

10. A refrigerant control valve apparatus comprising:
a housing including at least two inlet ports which are constituted by a first inlet port including a large diameter and a second inlet port including a small diameter, the first inlet port and the second inlet port distributing and receiving a refrigerant from an internal combustion engine, the housing including a discharge port which sends out the refrigerant;
a rotor forming a rotational body and controlling a flow of the refrigerant by rotating about a rotational axis at an inner portion of the housing;
a first seal provided at the first inlet port and making contact with an outer surface of the rotor, the first seal including an annular form; and
a second seal provided at the second inlet port and making contact with an outer surface of the rotor, the second seal including an annular form,
the rotor including:
a receiving portion including a first receiving portion and a second receiving portion for receiving the refrigerant from the first inlet port, the first receiving portion being formed in a wide width, the second receiving portion being formed in a narrow width;
an inner void accommodating the refrigerant which is received; and
a bore portion provided to send out the refrigerant to the discharge port,
at least a part of the second seal is configured to make contact with an edge portion of the first receiving portion in a case where at least a part of the first receiving portion is in communication with the second inlet port by a rotation of the rotor,
the first inlet port includes a center line passing through a center of a sphere forming the rotor, and
the first inlet port includes an inlet-side end portion inclined in a direction away from the discharge port.

11. The refrigerant control valve apparatus according to claim 10, wherein in a case where the rotor is rotated about the rotational axis, a positional relation is specified so that a reference locus at an outer circumference of the second receiving portion at one side in a direction along the rotational axis overlaps an outer circumference of the first receiving portion, and an intermediate locus at the outer circumference of the second receiving portion at the other side in the direction along the rotational axis reaches a center portion of the first receiving portion,
the first receiving portion is provided with a rib portion which divides the first receiving portion at the intermediate locus.

12. The refrigerant control valve apparatus according to claim 10, wherein the receiving portion includes a groove which extends to a side where the receiving portion starts overlapping the inlet port with the rotation of the rotor.

13. The refrigerant control valve apparatus according to claim 10, wherein the second receiving portion includes a longitudinal rib portion extending in an extending direction of a rotational shaft, the longitudinal rib portion being retracted towards a center of the rotational shaft relative to an imaginary outer wall surface obtained by an extension of an outer wall portion of the rotor for restraining a contact pressure with the first seal.

* * * * *